(12) United States Patent
Mizukami et al.

(10) Patent No.: US 10,663,169 B2
(45) Date of Patent: May 26, 2020

(54) CYLINDER FOR COMBUSTOR, COMBUSTOR, AND GAS TURBINE

(71) Applicant: MITSUBISHI HITACHI POWER SYSTEMS, LTD., Kanagawa (JP)

(72) Inventors: Satoshi Mizukami, Tokyo (JP); Satoshi Tanimura, Yokohama (JP); Tetsu Konishi, Yokohama (JP); Masaki Mitani, Yokohama (JP); Taiki Kinoshita, Yokohama (JP); Yoshiaki Yamaguchi, Tokyo (JP); Takaaki Hase, Tokyo (JP); Hiroshi Makigano, Tokyo (JP); Hikaru Kurosaki, Tokyo (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 196 days.

(21) Appl. No.: 15/317,309

(22) PCT Filed: Jul. 22, 2015

(86) PCT No.: PCT/JP2015/070854
§ 371 (c)(1),
(2) Date: Dec. 8, 2016

(87) PCT Pub. No.: WO2016/013585
PCT Pub. Date: Jan. 28, 2016

(65) Prior Publication Data
US 2017/0108221 A1    Apr. 20, 2017

(30) Foreign Application Priority Data

Jul. 25, 2014 (JP) .................................. 2014-151827

(51) Int. Cl.
*F23R 3/06* (2006.01)
*F23R 3/00* (2006.01)
(Continued)

(52) U.S. Cl.
CPC ................ *F23R 3/06* (2013.01); *F01D 9/023* (2013.01); *F23R 3/002* (2013.01);
(Continued)

(58) Field of Classification Search
CPC .. F23R 2900/03043; F23R 2900/03045; F23R 3/02; F23R 3/002; F23R 3/26; F01D 9/023; F23M 5/08; F23M 5/085
See application file for complete search history.

(56) References Cited

U.S. PATENT DOCUMENTS 5,235,805 A * 8/1993 Barbier ................... F23R 3/045
60/39.23
5,906,093 A * 5/1999 Coslow ................... F23R 3/005
60/39.37

(Continued)

FOREIGN PATENT DOCUMENTS

JP        2012-77660        4/2012

OTHER PUBLICATIONS

International Search Report dated Oct. 27, 2015 in International Application No. PCT/JP2015/070854 (with English translation).
(Continued)

*Primary Examiner* — Gerald L Sung
*Assistant Examiner* — Stephanie Cheng
(74) *Attorney, Agent, or Firm* — Wenderoth, Lind & Ponack, L.L.P.

(57) ABSTRACT

A cylinder for a combustor includes a cylindrical member, a first cooling passage defined in the cylindrical member and a second cooling passage defined in the cylindrical member, and a supply port extender. The first cooling passage includes a supply port that opens to an outer peripheral surface of the cylindrical member. The second cooling passage includes a discharge port that opens to the outer peripheral surface of the cylindrical member downstream of
(Continued)

the supply port. The supply port extender includes a first wall that is disposed between the supply port and the discharge port and extends away from the outer peripheral surface of the cylindrical member and a second wall that is disposed upstream of the supply port and extends away from the outer peripheral surface of the cylindrical member.

10 Claims, 14 Drawing Sheets

(51) Int. Cl.
  *F01D 9/02* (2006.01)
  *F23R 3/28* (2006.01)

(52) U.S. Cl.
  CPC .......... *F05D 2260/204* (2013.01); *F23R 3/28* (2013.01); *F23R 2900/00014* (2013.01); *F23R 2900/03042* (2013.01); *Y02T 50/676* (2013.01)

(56) References Cited

U.S. PATENT DOCUMENTS

| | | | | |
|---|---|---|---|---|
| 6,074,706 | A * | 6/2000 | Beverley | C23C 28/00 29/527.3 |
| 7,089,741 | B2 * | 8/2006 | Ikeda | F23R 3/002 60/725 |
| 9,188,336 | B2 * | 11/2015 | Chen | F23R 3/002 |
| 9,243,506 | B2 * | 1/2016 | McMahan | F01D 9/023 |
| 9,879,605 | B2 * | 1/2018 | Maurer | F02C 7/18 |
| 2010/0170260 | A1 * | 7/2010 | Mawatari | F23R 3/005 60/755 |
| 2013/0098063 | A1 | 4/2013 | Mizukami et al. | |
| 2013/0333388 | A1 * | 12/2013 | Polisetty | F23R 3/002 60/752 |

OTHER PUBLICATIONS

Written Opinion of the International Searching Authority dated Oct. 27, 2015 in International Application No. PCT/JP2015/070854 (with English translation).

* cited by examiner

CYLINDER FOR COMBUSTOR, COMBUSTOR, AND GAS TURBINE

TECHNICAL FIELD

The present invention relates to a cylinder for a combustor, a combustor, and a gas turbine.

This application claims priority based on Japanese Patent Application No. 2014-151827 filed in Japan on Jul. 25, 2014, of which the contents are incorporated herein by reference.

BACKGROUND ART

A gas turbine combustor is provided with a transition piece configured to send high temperature combustion gas to a turbine. Patent Document 1 describes a structure in which two types of cooling passages are formed in a wall portion of a transition piece to cool the wall portion of the transition piece.

The first cooling passage is formed in an upstream region of the transition piece located on the upstream side of the flow direction of the combustion gas flowing through the transition piece. In the first cooling passage, air in a casing inner space of the gas turbine where the transition piece is disposed is introduced to the upstream region of the transition piece as first cooling air. Accordingly, the first cooling passage includes a supply port that opens to the outer peripheral surface of the transition piece for introducing the first cooling air.

The second cooling passage is formed in a downstream region of the transition piece located on the downstream side of the flow direction of the combustion gas opposed to the upstream region described above. In the second cooling passage, a portion of compressed air compressed by a compressor of the gas turbine is introduced to the downstream region of the transition piece as second cooling air. The second cooling air, after being introduced to the second cooling passage to cool the downstream region, is discharged to the casing inner space of the gas turbine where the transition piece is disposed. Accordingly, the second cooling passage includes a discharge port that opens to the outer peripheral surface of the transition piece for discharging the second cooling air to the casing inner space. The discharge port of the second cooling passage is disposed downstream of the supply port of the first cooling passage in the flow direction of the combustion gas. The air discharged from the discharge port is the second cooling air heated by cooling the transition piece to become high temperature air.

Patent Document 1 also describes providing a partition wall disposed between the supply port of the first cooling passage and the discharge port of the second cooling passage. The partition wall protrudes from the outer peripheral surface of the transition piece, and is configured to prevent the high temperature air discharged from the discharge port of the second cooling passage to the casing inner space from entering the first cooling passage from the supply port.

CITATION LIST

Patent Literature

Patent Document 1: Japanese Unexamined Patent Application Publication No. 2012-077660A

SUMMARY OF INVENTION

Technical Problem

At the casing inner space where the transition piece is disposed, the combustion gas in the transition piece can flow in the direction opposite to the flow direction, and the high temperature air discharged from the discharge port of the second cooling passage can flow upstream of the supply port in the flow direction of the combustion gas. In such a case, the high temperature air discharge from the discharge port enters the first cooling passage from the supply port making it difficult to sufficiently lower the temperature of the air introduced into the first cooling passage. The cooling of the upstream region of the transition piece can be insufficient.

An object of the present invention is to provide a cylinder for a combustor capable of enhanced cooling efficiency and more reliable prevention of high temperature air discharged from the second cooling passage being introduced into the first cooling passage, and a combustor and a gas turbine provided with the same.

Solution to Problem

A first aspect of the present invention is a cylinder for a combustor through which a combustion gas flows configured to send the combustion gas to a turbine. The cylinder for a combustor includes a cylindrical member extending along an axis. The cylinder for a combustor further includes a first cooling passage formed in an upstream region located upstream in a flow direction of the combustion gas of a wall portion of the cylindrical member, the first cooling passage including a supply port that opens to an outer peripheral surface of the cylindrical member and being configured to cool the upstream region via a first cooling fluid introduced from a space outside of the cylindrical member via the supply port. The cylinder for a combustor further includes a second cooling passage formed in a downstream region located downstream in the flow direction of the combustion gas of the wall portion of the cylindrical member next to the upstream region, the second cooling passage being configured to cool the downstream region via supplied second cooling fluid and including a discharge port that opens to the outer peripheral surface of the cylindrical member downstream of the supply port in the flow direction of the combustion gas and is configured to discharge the second cooling fluid to the space outside of the cylindrical member. The cylinder for a combustor further includes a supply port extended portion including a first wall portion disposed between the supply port and the discharge port extending in a direction away from the outer peripheral surface of the cylindrical member, and a second wall portion disposed upstream of the supply port in the flow direction of the combustion gas, the second wall portion extending in a direction away from the outer peripheral surface of the cylindrical member.

In the cylinder for a combustor described above, the first wall portion of the supply port extended portion is provided between the supply port and the discharge port. Thus, in the space outside of the cylindrical member, even when fluid, which a portion thereof functions as the first cooling fluid, flows in the direction opposite the flow direction of the combustion gas inside the cylindrical member, the high temperature fluid (the second cooling air heated by cooling the wall portion of the cylindrical member) discharged from the discharge port of the second cooling passage can be prevented from entering the first cooling passage from the downstream supply port by the first wall portion.

The cylinder for a combustor described above is provided with the second wall portion of the supply port extended portion upstream of the supply port in the flow direction of the combustion gas. Thus, even if the high temperature fluid discharged from the discharge port flows upstream of the supply port in the flow direction of the combustion gas due to the flow of the fluid in the space outside of the cylindrical member, the high temperature fluid can be prevented from approaching the supply port by the second wall portion. Accordingly, the high temperature fluid, after flowing upstream of the supply port in the flow direction of the combustion gas, can be prevented from entering the first cooling passage from the supply port.

In the cylinder for a combustor described above, the supply port extended portion constituted by the first wall portion and the second wall portion opens to the space outside of the cylindrical member at a position spaced apart from the outer peripheral surface of the cylindrical member. The region spaced apart from the outer peripheral surface of the cylindrical member is difficult for the high temperature fluid discharged from the discharge port to reach. Thus, the lower temperature fluid present in the region spaced apart from the outer peripheral surface of the cylindrical member is able enter the first cooling passage as the first cooling fluid. Accordingly, the upstream region of the cylindrical member can be efficiently cooled.

A second aspect of the present invention is the cylinder for a combustor according to the first aspect further including a guide passage formed between the first wall portion and the second wall portion, the guide passage being configured to guide the first cooling fluid from the space outside of the cylindrical member to the supply port; wherein the guide passage includes an opening portion to the space outside of the cylindrical member that faces outward in a radial direction of the cylindrical member.

A third aspect of the present invention is the cylinder for a combustor according to the first aspect further including a guide passage formed between the first wall portion and the second wall portion, the guide passage being configured to guide the first cooling fluid from the space outside of the cylindrical member to the supply port; wherein the guide passage includes an opening portion to the space outside of the cylindrical member that faces downstream in the flow direction of the combustion gas and is located downstream of the discharge port in the flow direction of the combustion gas.

A fourth aspect of the present invention is the cylinder for a combustor according to any one of the first to third aspects, wherein the first wall portion and the second wall portion are formed around an entire of the cylindrical member in a circumferential direction to form an annular passage portion that communicates with the supply port.

A fifth aspect of the present invention is the cylinder for a combustor according the fourth aspect, further including a pair of prevention portions configured to prevent the first cooling fluid entering the annular passage portion from the space outside of the cylindrical member, the pair of prevention portions being disposed at counterpart positions in the radial direction of the cylindrical member.

A sixth aspect of the present invention is the cylinder for a combustor according to the fourth or fifth aspect, further including a partition portion dividing the annular passage portion in the circumferential direction.

A seventh aspect of the present invention is the cylinder for a combustor according to the fifth aspect, wherein a pair of the partition portions are disposed at counterpart positions in the radial direction of the cylindrical member.

An eighth aspect of the present invention is the cylinder for a combustor according to any one of the fourth to seventh aspects, wherein a passage cross-sectional area of the annular passage portion orthogonal to the circumferential direction of the cylindrical member is equal to or greater than 50 times an opening area of the supply port.

A ninth aspect of the present invention is the cylinder for a combustor according to any one of the fourth to eighth aspects, wherein the first wall portion and the second wall portion are formed in a cylindrical shape to form a cylindrical passage portion that communicates with the annular passage portion and the space outside of the cylindrical member.

A tenth aspect of the present invention is the cylinder for a combustor according to the ninth aspect, wherein a plurality of the cylindrical passage portions are arranged at intervals in the circumferential direction of the cylindrical member.

An eleventh aspect of the present invention is the cylinder for a combustor according to any one of the first to third aspect, wherein a plurality of the supply ports are arranged at intervals in a circumferential direction of the cylindrical member; and a plurality of the first wall portions and the second wall portions are formed in cylindrical shapes to form a plurality of cylindrical passage portions arranged at intervals in the circumferential direction of the cylindrical member, each of the plurality of cylindrical passage portions communicating with one of the plurality of supply ports.

A twelfth aspect of the present invention is the cylinder for a combustor according to the tenth or eleventh aspect, wherein positions in the circumferential direction of the plurality of cylindrical passage portions are aligned with positions in the circumferential direction of centers of a plurality of burners disposed at an end portion of the cylindrical member located upstream in the flow direction of the combustion gas and arranged in the circumferential direction of the cylindrical member.

A thirteenth aspect of the present invention is the cylinder for a combustor according to the twelfth aspect, wherein the plurality of cylindrical passage portions are arranged at equal intervals in the circumferential direction of the cylindrical member.

The fourteenth aspect of the present invention is the cylinder for a combustor according to any one of the first to thirteenth aspect, wherein the supply port extended portion is provided with a communication portion that communicates with a first space of the space outside of the cylindrical member located downstream of the first wall portion in the flow direction of the combustion gas and a second space of the space outside of the cylindrical member located upstream of the second wall portion in the flow direction of the combustion gas.

A fifteenth aspect of the present invention is the cylinder for a combustor according to any one of the first to fourteenth aspect, wherein the supply port extended portion is provided with a thermal insulation layer configured to decrease thermal conduction at the first wall portion and the second wall portion.

A sixteenth aspect of the present invention is the cylinder for a combustor according to any one of the first to fifteen aspect, wherein the supply port extended portion is supported by the outer peripheral surface of the cylindrical member.

A seventeenth aspect of the present invention is the cylinder for a combustor according to any one of the first to fifteenth aspect, further including an acoustic liner disposed upstream of the supply port extended portion of the cylindrical member in the flow direction of the combustion gas; wherein the supply port extended portion is supported by the acoustic liner.

An eighteenth aspect of the present invention is the cylinder for a combustor according to any one of the first to fifteenth aspect, wherein the supply port extended portion is formed integrally with the cylindrical member.

A nineteenth aspect of the present invention is a cylinder for a combustor through which a combustion gas flows configured to send the combustion gas to a turbine. The cylinder for a combustor is provided with a cylindrical member extending along an axis. The cylinder for a combustor is further provided with a first cooling passage formed in an upstream region located upstream in a flow direction of the combustion gas of a wall portion of the cylindrical member, the first cooling passage including a supply port that opens to an outer peripheral surface of the cylindrical member and being configured to cool the upstream region via a first cooling fluid introduced from a space outside of the cylindrical member via the supply port. The cylinder for a combustor is further provided with a second cooling passage formed in a downstream region located downstream in the flow direction of the combustion gas of the wall portion of the cylindrical member next to the upstream region, the second cooling passage being configured to cool the downstream region via supplied second cooling fluid and including a discharge port that opens to the outer peripheral surface of the cylindrical member downstream of the supply port in the flow direction of the combustion gas and is configured to discharge the second cooling fluid to the space outside of the cylindrical member.

The cylinder for a combustor is further provided with a guide wall portion formed between the supply port and the discharge port extending in a direction away from the outer peripheral surface of the cylindrical member, the guide wall portion being configured to guide fluid flowing in a direction opposite the flow direction of the combustion gas in the space outside of the cylindrical member from the supply port in a circumferential direction of the cylindrical member, and guide the fluid upstream of the supply port in the flow direction of the combustion gas.

According to the cylinder for a combustor described above, even when fluid, which a portion thereof functions as the first cooling fluid, flows in the direction opposite the flow direction of the combustion gas inside the cylindrical member, the high temperature fluid (the second cooling air heated by cooling the wall portion of the cylindrical member) discharged from the discharge port of the second cooling passage can be prevented from entering the first cooling passage from the downstream supply port by the guide wall portion.

In the cylinder for a combustor described above, the fluid flowing in the space outside of the cylindrical member in the direction opposite the flow direction of the combustion gas is guided by the guide wall portion in the circumferential direction of the cylindrical member and upstream of the supply port in the flow direction of the combustion gas. Thus, if the high temperature fluid flows upstream of the supply port in the flow direction of the combustion gas due to the flow of the fluid in the space outside of the cylindrical member, the high temperature fluid can be prevented from approaching the supply port by the guide wall portion. Accordingly, the high temperature fluid, after flowing upstream of the supply port in the flow direction of the combustion gas, can be prevented from entering the first cooling passage from the supply port.

A twentieth aspect of the present invention is a combustor that is provided with the cylinder for a combustor according to any one of the first to nineteenth aspects; and a burner configured to spray fuel.

A twenty-first aspect of the present invention is a gas turbine that is provided with the combustor according to the twentieth aspect; a compressor configured to generate compressed air to be fed to the combustor; and a turbine including a rotor configured to be rotated by combustion gas fed from the combustor.

Advantageous Effects of Invention

According to the cylinder for a combustor, the combustor, and the gas turbine described above, the high temperature fluid (the second cooling fluid heated by cooling the wall portion of the cylindrical member) discharged from the discharge port of the second cooling passage can be more reliably prevented from entering the first cooling passage, and the upstream region of the cylindrical member can be efficiently cooled by the first cooling fluid introduced to the first cooling passage. In other words, the cooling efficiency of the cylinder for a combustor can be enhanced.

DESCRIPTION OF EMBODIMENTS

Hereinafter, embodiments of a cylinder for a combustor, a combustor, and a gas turbine according to the present invention will be described with reference to the drawings. However, the present invention is not limited to these embodiments.

First Embodiment

First, a cylinder for a combustor, a combustor, and a gas turbine according to a first embodiment will be described with reference to FIGS. 1 to 6.

Figure 1:
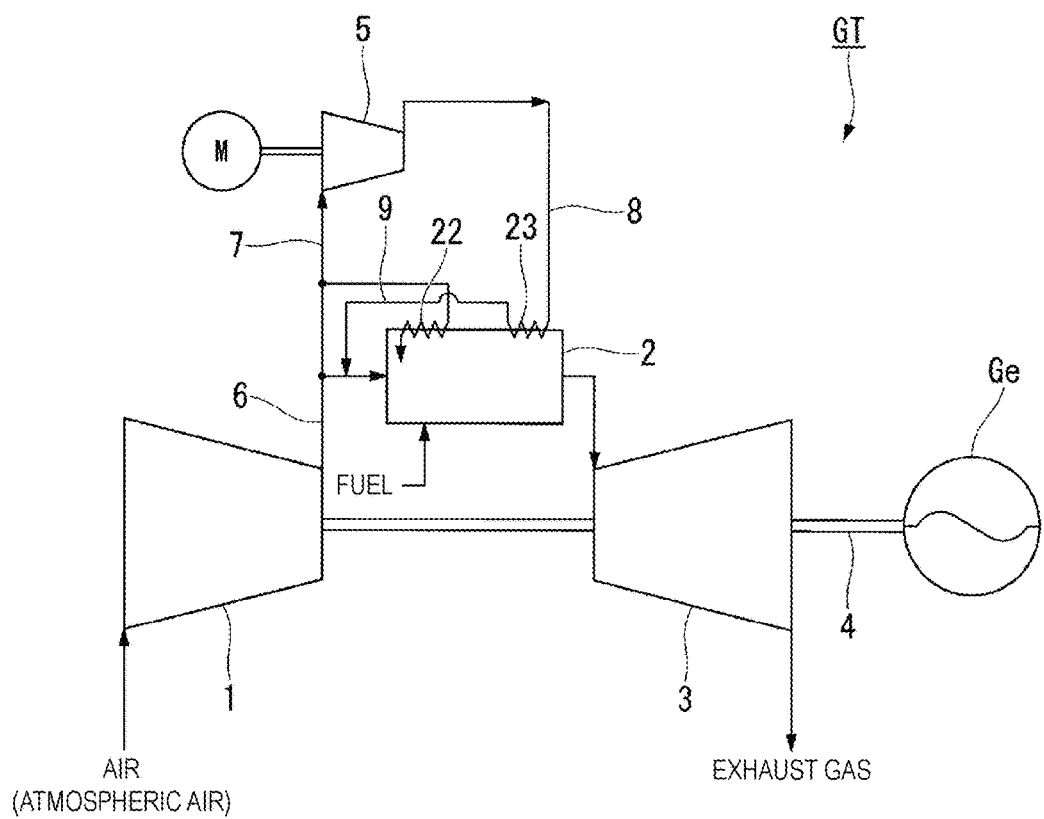
FIG. 1 is a schematic view of the overall configuration of a gas turbine according to a first embodiment of the present invention.

As illustrated in FIG. 1, a gas turbine GT of the present embodiment is provided with a compressor 1, a combustor 2, and a turbine 3.

The compressor 1 takes in air from an air inlet port as a working fluid and generates compressed air.

The combustor 2 is connected to a discharge port of the compressor 1. The combustor 2 sprays fuel to the compressed air discharged from the compressor 1 to cause a combustion gas that has a high temperature and a high pressure to be generated.

The turbine 3 converts the thermal energy of the combustion gas fed from the combustor 2 into rotation energy for a rotor 4 and causes a driving force to be generated. The turbine 3 transfers the generated driving force to a generator Ge coupled to the rotor 4.

The gas turbine GT of the present embodiment is further provided with a pressurizing device 5. The pressurizing device 5 bleeds a portion of the compressed air compressed at the compressor 1 to pressurize the compressed air to a higher pressure. The pressurizing device 5 is provided on a branched passage 7 and is driven, for example, by an electric motor M. The branched passage 7 branches from a compressed air supply passage 6, through which compressed air is supplied from the compressor 1 to the combustor 2, partway along and bleeds a portion of the compressed air.

The bled pressurized air pressurized at the pressurizing device 5 is supplied to the combustor 2 through a pressurized air passage 8 and is used as air (hereinafter referred to as "cooling air") for cooling a transition piece 21 of the combustor 2 described below. The cooling air after being used to cool the transition piece 21 is then returned to the compressed air supply passage 6 through a return passage 9 where the returned cooling air merges with the main flow of the compressed air flowing through the compressed air supply passage 6. Thereafter, the cooling air is reused as combustion air for the combustion of fuel at the combustor 2.

In other words, the gas turbine GT of the present embodiment is provided with a recovery type air cooling structure (closed cycle cooling structure) in which a portion of the compressed air supplied from the compressor 1 and used as combustion air at the combustor 2 is used as cooling air to cool the transition piece 21 of the combustor 2, and thereafter this cooling air is recovered and reused as combustion air at the combustor 2 together with the main flow of the compressed air. The portion of the compressed air bled from the main flow (compressed air supply passage 6) is not limited to being used for cooling the transition piece 21 of the combustor 2 as illustrated in FIG. 1, and may be used, for example, for cooling of vanes and blades of the turbine 3 in addition to the transition piece 21 of the combustor 2.

Figure 2:
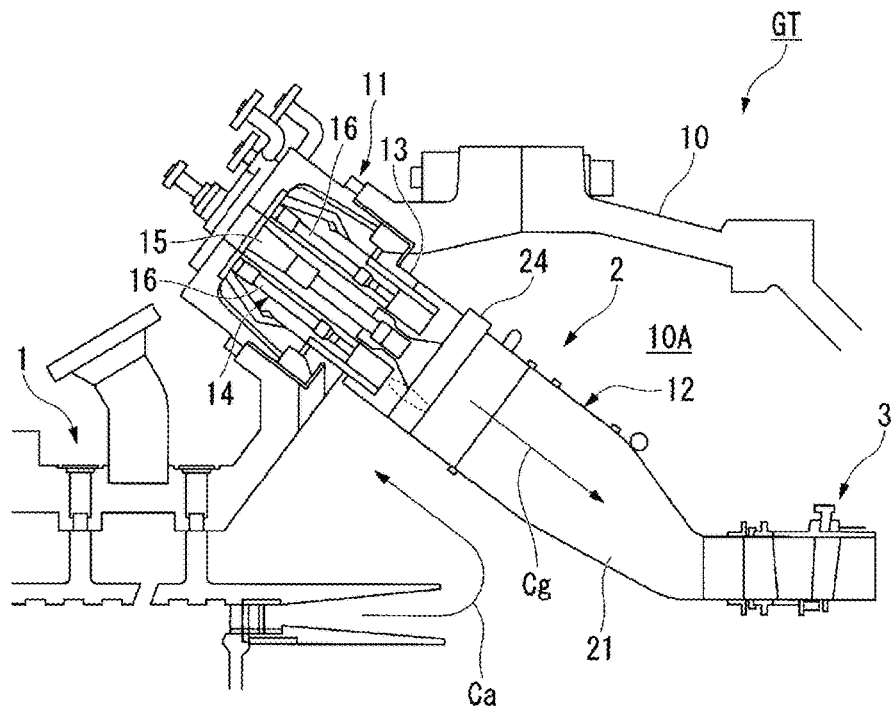
FIG. 2 is a view of an example of the configuration of the gas turbine according to the first embodiment and peripheral structures.
Figure 3:
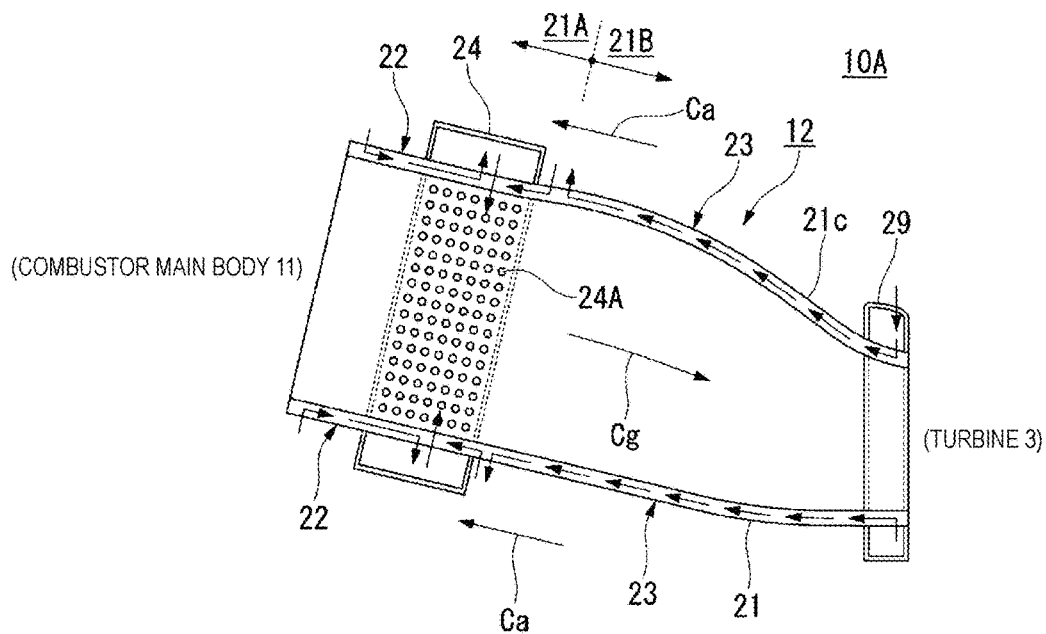
FIG. 3 is a schematic cross-sectional view of a cylinder for a combustor according to the first embodiment of the present invention.

The combustor 2 has a substantially cylindrical shaped exterior, and, as illustrated in FIG. 2, is disposed mainly within a casing inner space 10A formed in a casing 10 of the gas turbine GT. In the casing inner space 10A where the combustor 2 is disposed, the compressed air compressed at the compressor 1 is introduced to fill the casing inner space 10A. The combustor 2 is provided with a combustor main body 11 and a cylinder for a combustor 12.

The combustor main body 11 functions as a combustion chamber that causes the supplied fuel to react with the compressed air discharged from the compressor 1. The cylinder for a combustor 12 sends the combustion gas flowing in from the combustor main body 11 to the turbine 3.

The combustor main body 11 is provided with a substantially cylindrical combustor basket 13 and a burner 14 disposed in the combustor basket 13 that sprays the fuel.

A first opening of the combustor basket 13 is an upstream opening for introducing the compressed air filled in the casing inner space 10A into the combustor basket 13. A second opening of the combustor basket 13 is a downstream opening connected to the transition piece 21 described below.

The burner 14 includes a pilot burner 15 and a main burner 16. The pilot burner 15 is provided along the central axis of the combustor basket 13. The pilot burner 15 sprays fuel supplied from the outside inducing diffusion combustion of the fuel. A plurality of the main burners 16 are provided in the combustor basket 13. The plurality of main burners 16 are arranged at intervals in the circumferential direction of the combustor basket 13 surrounding the pilot burner 15. Each main burner 16 extends in parallel with the central axis of the combustor basket 13. The main burners 16 spray a fuel-air premixture generated by mixing in advance sprayed fuel and the compressed air. This fuel-air premixture is then combusted.

The cylinder for a combustor 12 is provided with, as illustrated in FIGS. 2 to 6, a transition piece (cylindrical member) 21, a first cooling passage 22, a second cooling passage 23, and an acoustic liner 24.

The transition piece 21 extends along the axis. Additionally, the transition piece 21 increases the flow velocity of the combustion gas Cg flowing in from the combustor main body 11 and introduces the combustion gas Cg into the turbine 3. A first opening of the transition piece 21 is connected to a downstream opening of the combustor basket 13 of the combustor main body 11 described above (see FIG. 2). A second opening of the transition piece 21 is connected to the turbine 3. The combustion gas Cg that flows in from the combustor main body 11 flows through the inside of the transition piece 21. In FIGS. 3 to 6, the combustion gas Cg flows through the inside of the transition piece 21 from the left side (upstream side) to the right side (downstream side) of the paper. In the space around the outside of the transition piece 21, i.e. in the casing inner space 10A, the compressed air Ca discharged from the compressor 1 flows toward the upstream opening of the combustor basket 13 described above in the direction opposite to the flow direction of the combustion gas Cg in the transition piece 21.

The first cooling passage 22 is formed in an upstream region 21A located upstream in the flow direction of the combustion gas Cg of the wall portion of the transition piece 21. The first cooling passage 22 includes a supply port 25 that opens to an outer peripheral surface 21c of the transition piece 21. Accordingly, the first cooling passage 22 introduces the compressed air (fluid) Ca from the casing inner space 10A via the supply port 25 as first cooling air (first cooling fluid) to cool the upstream region 21A of the transition piece 21.

The first cooling passage 22 of the present embodiment extends along the axial direction of the transition piece 21. A plurality of the first cooling passages 22 are arranged at intervals in the circumferential direction of the transition piece 21.

For each of the first cooling passages 22, one supply port 25 is provided on either side in the flow direction of the combustion gas Cg of the acoustic liner 24 disposed in the upstream region 21A of the transition piece 21. The supply ports 25A (hereinafter downstream supply ports 25A) of the plurality of first cooling passages 22 located downstream of the acoustic liner 24 in the flow direction of the combustion gas Cg are arranged aligned in the circumferential direction of the transition piece 21.

Each of the first cooling passages 22 includes a discharge port 26 that opens to the outer peripheral surface 21c of the transition piece 21 and discharges the first cooling air outside of the transition piece 21. The discharge ports 26 of the first cooling passages 22 open to the inside of the acoustic liner 24. In other words, the first cooling air is discharged inside the acoustic liner 24 after cooling the upstream region 21A of the transition piece 21.

The second cooling passage 23 is formed in a downstream region 21B located downstream in the flow direction of the combustion gas Cg next to the upstream region 21A of the transition piece 21 of the wall portion of the transition piece 21. The second cooling passage 23 supplies the bled pressurized air pressured at the pressurizing device 5 described above (see FIG. 1) to the second cooling passage 23 as second cooling air (second cooling fluid) to cool the downstream region 21B of the transition piece 21. The second cooling passage 23 includes a discharge port 27 that opens to the outer peripheral surface 21c of the transition piece 21 downstream of the downstream supply port 25A. The discharge port 27 discharges the second cooling air to the casing inner space 10A.

The second cooling passage 23 of the present embodiment extends along the axial direction of the transition piece 21. A plurality of the second cooling passages 23 are arranged at intervals in the circumferential direction of the transition piece 21.

The discharge ports 27 of the second cooling passages 23 are provided at first end portions in the longitudinal direction of the second cooling passages 23 located upstream in the flow direction of the combustion gas Cg. The discharge ports 27 of the second cooling passages 23 are arranged aligned in the circumferential direction of the transition piece 21.

Each of the second cooling passages 23 includes a supply port 28 that opens to the outer peripheral surface 21c of the transition piece 21 for introducing the second cooling air into the second cooling passage 23. The supply ports 28 of the second cooling passages 23 are provided at second end portions in the longitudinal direction of the second cooling passages 23 and are located at the downstream end portion of the transition piece 21 on the side of the turbine 3.

An annular passage portion 29 (manifold) is formed on the outer peripheral surface 21c of the transition piece 21 on the downstream end portion around the entire transition piece 21 in the circumferential direction. The annular passage portion 29 covers en bloc the supply ports 28 of the plurality of second cooling passages 23 and defines an introduction space that communicates with the supply ports 28 of the second cooling passages 23. The annular passage portion 29 is formed with the introduction space not communicating with the casing inner space 10A. Accordingly, the second cooling air (bled pressurized air pressurized at the pressurizing device 5) is supplied from the supply ports 28 of the second cooling passages 23 to the second cooling passages 23 via the inside of the annular passage portion 29.

The second cooling air supplied to the second cooling passages 23 is discharged to the casing inner space 10A after cooling the downstream region 21B of the transition piece 21. The second cooling air in the second cooling passages 23 is heated by cooling the wall portion of the transition piece 21. As a result, when discharged from the discharge ports 27 of the second cooling passages 23, the second cooling air becomes high temperature air (high temperature fluid) with a temperature higher than the temperature of the second cooling air at the supply ports 28 of the second cooling passages 23 and the temperature of the compressed air Ca filled in the casing inner space 10A. The high temperature air (second cooling air) discharged to the casing inner space 10A merges with the compressed air Ca filled in the casing inner space 10A and is reused as combustion air.

The acoustic liner 24 is provided on the periphery of the transition piece 21 in the upstream region 21A. A portion of the acoustic liner 24 is constituted by the wall portion of the transition piece 21. The space inside the acoustic liner 24 communicates with the inside of the transition piece 21 via a plurality of acoustic holes 24A formed passing through the wall portion of the transition piece 21. Accordingly, the first cooling passage 22 described above is provided at a position that does not interfere with the acoustic holes 24A. The acoustic liner 24 reduces combustion oscillations of the gas turbine GT (self-oscillations caused by feedback of pressure fluctuation, combustion speed fluctuation, and heat release rate fluctuation in the combustor 2).

By disposing the acoustic holes 24A in the acoustic liner 24 as described above, the first cooling air discharged from the discharge port 26 of the first cooling passage 22 described above inside the acoustic liner 24 flows out to the inside of the transition piece 21 through the acoustic holes 24A.

Figure 4:
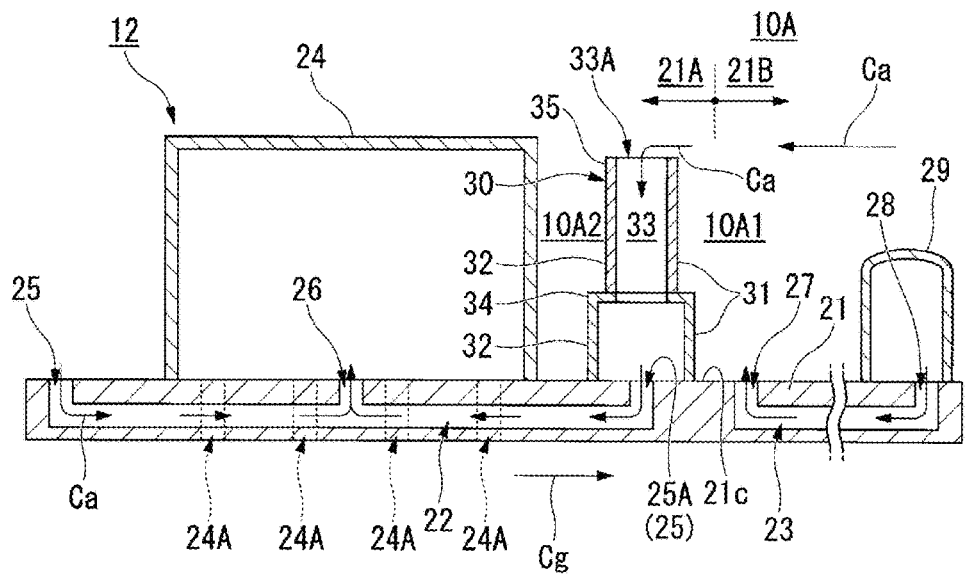
FIG. 4 is a cross-sectional view of main components of the cylinder for a combustor illustrated in FIG. 3.
Figure 5:
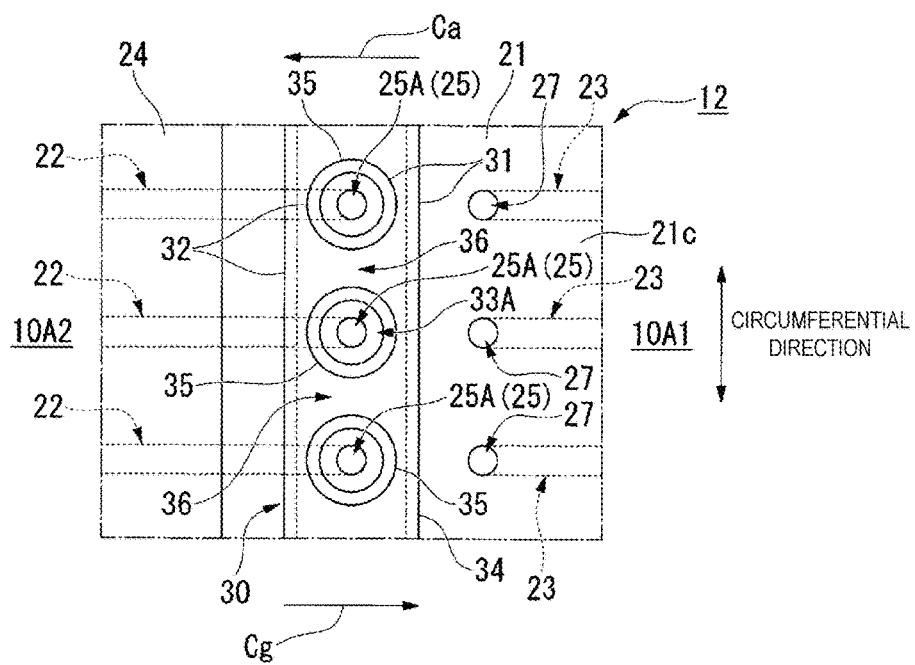
FIG. 5 is a plan view from outward in the radial direction of a transition piece of the main components of the cylinder for a combustor illustrated in FIG. 4.
Figure 6:
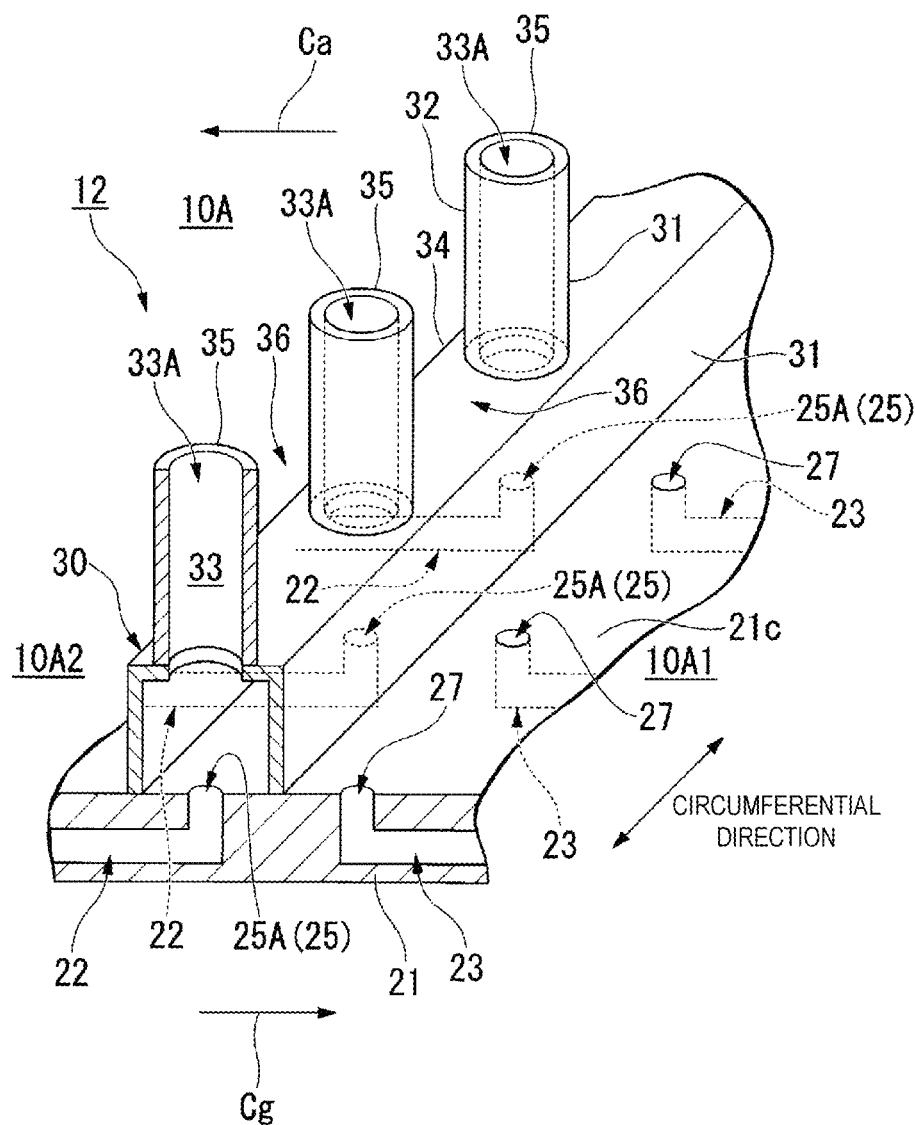
FIG. 6 is a partially fragmented perspective view of the main components of the cylinder for a combustor illustrated in FIGS. 4 and 5.

The cylinder for a combustor 12 described above is provided with a supply port extended portion 30 as illustrated in FIGS. 4 to 6.

The supply port extended portion 30 is provided with a first wall portion 31 between the downstream supply port 25A of the first cooling passage 22 and the discharge port 27 of the second cooling passage 23. The first wall portion 31 extends in a direction away from the outer peripheral surface 21c of the transition piece 21. The supply port extended portion 30 is further provided with a second wall portion 32 upstream of the downstream supply port 25A in the flow direction of the combustion gas Cg. The second wall portion 32 extends in a direction away from the outer peripheral surface 21c of the transition piece 21. In the present embodiment, the second wall portion 32 is disposed between the downstream supply port 25A of the first cooling passage 22 and the acoustic liner 24.

A guide passage 33 is formed between the first wall portion 31 and the second wall portion 32. The guide passage 33 guides the compressed air Ca, which will become the first cooling air, from the casing inner space 10A to the downstream supply port 25A of the first cooling passage 22. An opening portion 33A of the guide passage 33 to the casing inner space 10A is located at least spaced apart from the outer peripheral surface 21c of the transition piece 21 outward in the radial direction of the transition piece 21. In the present embodiment, the opening portion 33A of the guide passage 33 faces outward in the radial direction of the transition piece 21. In other words, in the present embodiment, the first wall portion 31 and the second wall portion 32 extend outward in the radial direction of the transition piece 21.

The height position of the opening portion 33A of the guide passage 33 from the outer peripheral surface 21c of the transition piece 21 is not limited to a particular height position and may be, as illustrated in FIG. 4 for example, set lower than the acoustic liner 24 or may be set higher than the acoustic liner 24.

In the present embodiment, the first wall portion 31 and the second wall portion 32 are formed around the entire of the transition piece 21 in the circumferential direction to form an annular passage portion 34 that communicates with the downstream supply port 25A. Additionally, the first wall portion 31 and the second wall portion 32 are formed in a cylindrical shape and constitute a cylindrical passage portion 35 that communicates with the annular passage portion 34 and the casing inner space 10A.

In other words, the portions of the annular passage portion 34 and the cylindrical passage portion 35 located downstream of the downstream supply port 25A in the flow direction of the combustion gas Cg are constituted by the first wall portion 31. The portions of the annular passage portion 34 and the cylindrical passage portion 35 located upstream of the downstream supply port 25A in the flow direction of the combustion gas Cg are constituted by the second wall portion 32.

The guide passage 33 described above is formed by the annular passage portion 34 and the cylindrical passage portion 35. The opening of the cylindrical passage portion 35 to the casing inner space 10A corresponds to the opening portion 33A of the guide passage 33. The cylindrical passage portion 35 of the present embodiment extends in a rectilinear manner in the radial direction of the transition piece 21. Accordingly, the opening portion 33A of the guide passage 33 faces outward in the radial direction of the transition piece 21.

The supply port extended portion 30 of the present embodiment is provided with a communication portion 36 that communicates with a first space 10A1 and a second space 10A2 of the casing inner space 10A. The first space 10A1 is located downstream of the first wall portion 31 in the flow direction of the combustion gas Cg and the second space 10A2 is located upstream of the second wall portion 32 in the flow direction of the combustion gas Cg. In the present embodiment, a plurality of the cylindrical passage portions 35 are arranged at intervals in the circumferential direction of the transition piece 21. This allows each of the gaps between cylindrical passage portions 35 adjacent in the circumferential direction to function as the communication portion 36 described above.

The positions in the circumferential direction of the cylindrical passage portions 35 arranged in the circumferential direction of the transition piece 21 may be in alignment with the positions in the circumferential direction of the downstream supply ports 25A arranged in the circumferential direction of the transition piece 21 as illustrated in FIG. 5 for example. However, the positions in the circumferential direction of the cylindrical passage portions 35 may also be offset in the circumferential direction of the transition piece 21 with the position in the circumferential direction of the downstream supply ports 25A.

Each of the cylindrical passage portions 35 may be provided located above one downstream supply port 25A in the radial direction of the transition piece 21 as illustrated in FIG. 5 for example. However, for example, each of the cylindrical passage portions 35 may also be located above a plurality of the downstream supply ports 25A in the radial direction of the transition piece 21. Each of the cylindrical passage portions 35 may, for example, be provided located above no downstream supply port 25A in the radial direction of the transition piece 21.

Each of the cylindrical passage portions 35 may have a circular cylindrical shape when viewed from outward in the radial direction of the transition piece 21 as illustrated in FIG. 5. The shape may also be square cylindrical shape or an elliptical or rectangular cylindrical shape extending in the circumferential direction of the transition piece 21 for example.

The supply port extended portion 30 of the present embodiment is supported by the outer peripheral surface 21c of the transition piece 21. Specifically, the supply port extended portion 30 is, for example, fixed to the outer peripheral surface 21c of the transition piece 21 by welding, brazing, or the like. In FIGS. 4 to 6, the annular passage portion 34 of the supply port extended portion 30 is fixed to the outer peripheral surface 21c of the transition piece 21.

The supply port extended portion 30 described above is not limited to being provided only on the downstream supply port 25A of the first cooling passage 22, and may, for example, be provided on both supply ports 25 of the first cooling passage 22.

The cylinder for a combustor 12 of the present embodiment constituted as described above is provided with the first wall portion 31 of the supply port extended portion 30 between the downstream supply port 25A of the first cooling passage 22 and the discharge port 27 of the second cooling passage 23. Thus, even when compressed air Ca in the casing inner space 10A flows in the direction opposite the flow direction of the combustion gas Cg inside the transition piece 21, the high temperature air (the second cooling air heated by cooling the wall portion of the transition piece 21) discharged from the discharge port 27 of the second cooling passage 23 can be prevented from entering the first cooling passage 22 from the downstream supply port 25A by the first wall portion 31.

The cylinder for a combustor 12 of the present embodiment is provided with the second wall portion 32 of the supply port extended portion 30 upstream of the downstream supply port 25A of the first cooling passage 22 in the flow direction of the combustion gas Cg. Thus, even if the high temperature air (second cooling air) discharged from the discharge port 27 of the second cooling passage 23 flows upstream of the downstream supply port 25A of the first cooling passage 22 in the flow direction of the combustion gas Cg due to the flow of the compressed air Ca in the casing inner space 10A, the high temperature air can be prevented from approaching the downstream supply port 25A by the second wall portion 32. Accordingly, the high temperature air, after flowing upstream of the downstream supply port 25A in the flow direction of the combustion gas Cg, can be prevented from entering the first cooling passage 22 from the downstream supply port 25A.

In the cylinder for a combustor 12 of the present embodiment, the supply port extended portion 30 constituted by the first wall portion 31 and the second wall portion 32 opens to the casing inner space 10A at a position spaced apart from the outer peripheral surface 21c of the transition piece 21. The region spaced apart from the outer peripheral surface 21c of the transition piece 21 is difficult for the high temperature air discharged from the discharge port 27 of the second cooling passage 23 to reach. Thus, the compressed air Ca, the temperature of which is lower than that of the high temperature air, present in the region spaced apart from the outer peripheral surface 21c of the transition piece 21 is able enter the first cooling passage 22 as the first cooling fluid.

According to the cylinder for a combustor 12 and the combustor 2 and gas turbine GT provided with the same according to the present embodiment described above, the high temperature air discharged from the discharge port 27 of the second cooling passage 23 can be more reliably prevented from entering the first cooling passage 22, and the upstream region 21A of the transition piece 21 can be efficiently cooled by the low temperature first cooling fluid introduced to the first cooling passage 22. In other words, the cooling efficiency of the cylinder for a combustor 12 can be enhanced.

According to the cylinder for a combustor 12 of the present embodiment, the opening portion 33A of the guide passage 33 of the supply port extended portion 30 located spaced apart from the outer peripheral surface 21c of the transition piece 21 faces outward in the radial direction of the transition piece 21. As a result, the high temperature air (second cooling air) discharged from the discharge port 27 of the second cooling passage 23 that opens to the outer peripheral surface 21c of the transition piece 21 can be suitably prevented from entering the guide passage 33.

The structure of the cylinder for a combustor 12 of the present embodiment, in which the opening portion 33A of the guide passage 33 faces outward in the radial direction of the transition piece 21, can be easily manufactured. For example, the rectilinearly extending annular passage portion 34 and cylindrical passage portion 35 are easily manufactured, and the annular passage portion 34 and the cylindrical passage portion 35 are easily installed to extend outward in the radial direction of the transition piece 21. In other words, the manufacture and installation of the supply port extended portion 30 can be easily performed. Accordingly, the cylinder for a combustor 12 provided with the supply port extended portion 30 can be manufactured at a low cost.

According to the cylinder for a combustor 12 of the present embodiment, the supply port extended portion 30 is constituted by the annular passage portion 34 and the cylindrical passage portion 35 build on top of each other on the outer peripheral surface 21c of the transition piece 21. The opening portion 33A of the guide passage 33 is configured by the cylindrical passage portion 35. In other words, the region of the opening portion 33A through which the compressed air Ca is introduced into the guide passage 33 is defined by the cylindrical passage portion 35. Thus, the high temperature air (second cooling air) discharged from the discharge port 27 of the second cooling passage 23 can be suitably prevented from entering the guide passage 33.

In the cylinder for a combustor 12 of the present embodiment, the compressed air Ca (first cooling air) introduced from the casing inner space 10A to the space inside the cylindrical passage portion 35 is introduced to the space inside the annular passage portion 34 to be dispersed around the entire transition piece 21 in the circumferential direction. As a result, even when the cylindrical passage portion 35 is provided in only a portion of the transition piece 21 in the circumferential direction, the compressed air Ca can be introduced to the plurality of first cooling passages 22 arranged all around in the circumferential direction.

According to the cylinder for a combustor 12 of the present embodiment, the supply port extended portion 30 is provided with the communication portion 36 that communicates with the first space 10A1 and the second space 10A2 of the casing inner space 10A. The first space 10A1 is located downstream of the first wall portion 31 in the flow direction of the combustion gas Cg and the second space 10A2 is located upstream of the second wall portion 32 in the flow direction of the combustion gas Cg. Thus, the high temperature air discharged from the discharge port 27 of the second cooling passage 23 is caused by the flow of the compressed air Ca in the casing inner space 10A to be merged with the flow of the compressed air Ca in the casing inner space 10A and flow from the first space 10A1 to the second space 10A2 via the communication portion 36. This allows the high temperature air to be prevented from flowing outward in the radial direction. As a result, the length of the first wall portion 31 and the second wall portion 32 extending outward in the radial direction from the outer peripheral surface 21c of the transition piece 21 can be kept to a short length.

In the cylinder for a combustor 12 of the present embodiment, the communication portion 36 of the supply port extended portion 30 is constituted by a gap between the cylindrical passage portions 35 adjacent in the circumferential direction. Because the rectilinearly extending cylindrical passage portion 35 can be easily manufactured as described above, the communication portion 36 of the supply port extended portion 30 can be easily manufactured.

According to the cylinder for a combustor 12 of the present embodiment, the supply port extended portion 30 is fixed to the outer peripheral surface 21c of the transition piece 21 by welding. As a result, gaps can be reliably prevented from forming between the supply port extended portion 30 and the outer peripheral surface 21c of the transition piece 21. Thus, the compressed air Ca introduced from the casing inner space 10A to the guide passage 33 of the supply port extended portion 30 can be prevented from leaking out from the gap between the supply port extended portion 30 and the outer peripheral surface 21c of the transition piece 21 to the casing inner space 10A, and the compressed air Ca can be efficiently introduced to the first cooling passage 22.

Second Embodiment

Next, a cylinder for a combustor, a combustor, and a gas turbine of a second embodiment according to the present invention will be described with reference to FIGS. 7 and 8. In the second embodiment, components common to the first embodiment described above are given the same reference sign in the drawings and explanations thereof are omitted.

Figure 7:
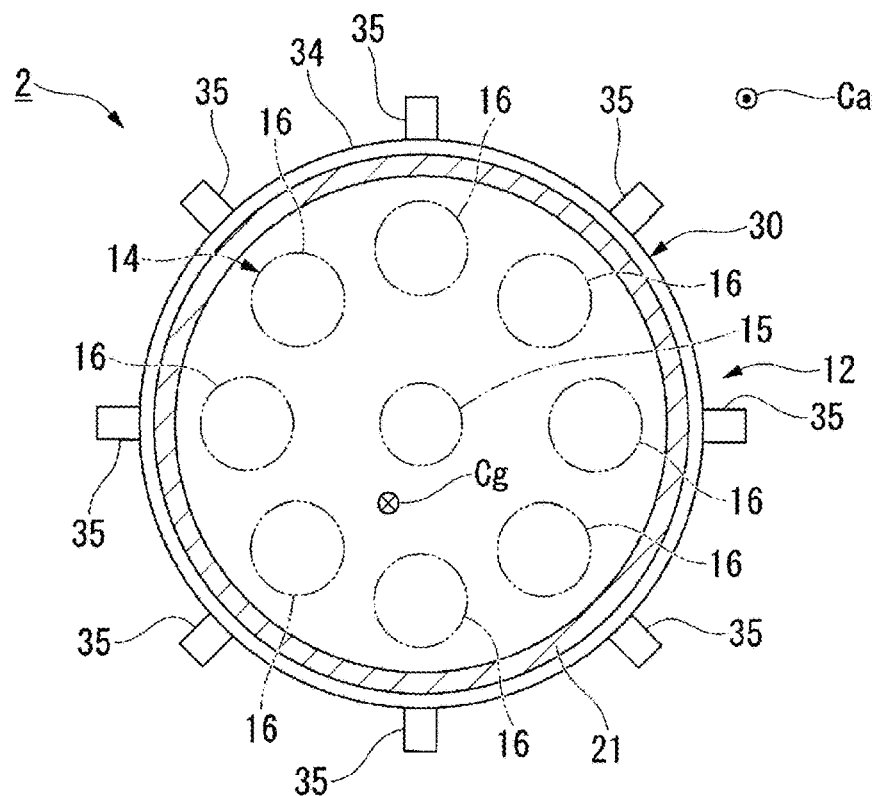
FIG. 7 is a schematic cross-sectional view from upstream in a flow direction of a combustion gas of a cylinder for a combustor according to a second embodiment of the present invention.
Figure 8:
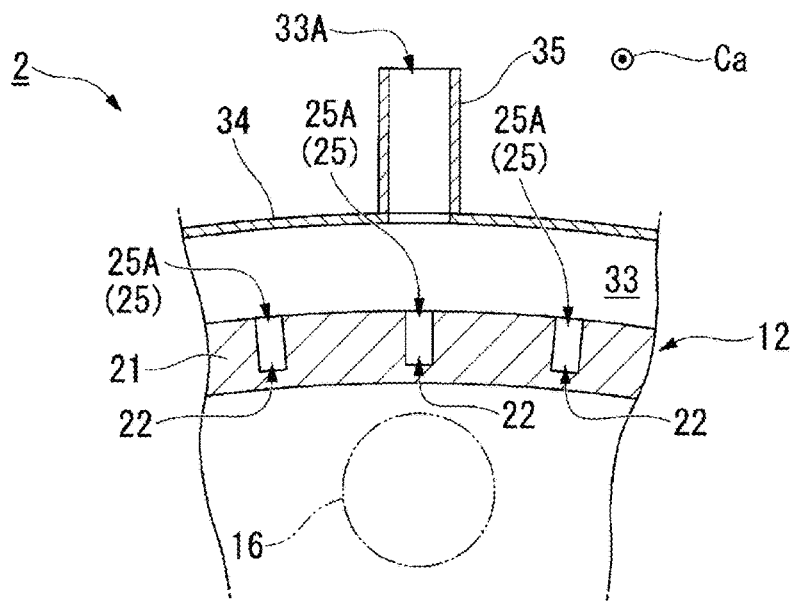
FIG. 8 is an enlarged cross-sectional view of the main components of the cylinder for a combustor illustrated in FIG. 7.

As illustrated in FIGS. 7 and 8, the combustor 2 of the present embodiment is provided the combustor main body 11 (see FIG. 2) and the cylinder for a combustor 12 similar to that of the first embodiment. The combustor main body 11 is provided with the combustor basket 13 (see FIG. 2) and the burner 14 similar to that of the first embodiment. The burner 14 includes the pilot burner 15 and the main burner (burner) 16.

As described in the first embodiment, the pilot burner 15 and the main burner 16 are disposed in the combustor basket 13, i.e. the end portion upstream in the flow direction of the combustion gas Cg of the transition piece 21. The pilot burner 15 is provided along the central axis of the combustor basket 13. A plurality of the main burners 16 (eight in FIG. 7) are arranged in the circumferential direction of the combustor basket 13 surrounding the pilot burner 15. In the present embodiment, the main burners 16 are arranged at equal intervals in the circumferential direction of the combustor basket 13. The number of the main burners 16 is discretionary.

The cylinder for a combustor 12 of the present embodiment is provided with the supply port extended portion 30 including the annular passage portion 34 and the plurality of cylindrical passage portions 35 similar to the first embodiment.

In the present embodiment, the positions in the circumferential direction of the cylindrical passage portions 35 are aligned with the positions in the circumferential direction of the centers the main burners 16. Furthermore, in the present embodiment, the plurality of cylindrical passage portions 35 are arranged at equal intervals in the circumferential direction of the transition piece 21.

In the present embodiment, the number of the cylindrical passage portions 35 matches the number of main burners 16 as illustrated in FIG. 7. However, as long as the plurality of cylindrical passage portions 35 are arranged at equal intervals in the circumferential direction of the transition piece 21, the number of the cylindrical passage portions 35 may be greater or less than the number of main burners 16, for example.

When the number of cylindrical passage portions 35 is less than the number of main burners 16, the number of cylindrical passage portions 35 may be 1/2, 1/3, 1/4, etc. of the number of main burners 16 for example. When the number of cylindrical passage portions 35 is greater than the number of main burners 16, the number of cylindrical passage portions 35 may be an integer multiple (2 times, 3 times, 4 times, etc.) of the number of main burners 16 for example. In such a case, a portion of the plurality of cylindrical passage portions 35 have their positions in the circumferential direction aligned with the positions in the circumferential direction of the centers of the main burners 16, and the other cylindrical passage portions 35 are offset in the circumferential direction of the transition piece 21 from the position in the circumferential direction of the centers of the main burners 16.

In the transition piece 21 of the present embodiment, as illustrated in FIG. 8 for example, a portion of the plurality of downstream supply ports 25A of the first cooling passages 22 arranged in the circumferential direction of the transition piece 21 are aligned with the positions in the circumferential direction of the cylindrical passage portions 35 disposed in alignment with the positions in the circumferential direction of the centers of the main burners 16.

According to the cylinder for a combustor 12, and the combustor 2 and gas turbine GT provided with the same of the present embodiment configured as described above, the same effect achieved by the first embodiment is achieved.

According to the cylinder for a combustor 12 of the present embodiment, the upstream region 21A of the transition piece 21 (see FIGS. 3 and 4) can be more efficiently cooled. Specifically, the amount of heat from the main burner 16 at the wall portion of the upstream region 21A of the transition piece 21 is maximized at the circumferential portions of the transition piece 21 that corresponds to the positions in the circumferential direction of the centers of the main burners 16 and minimized at the circumferential portions of the transition piece 21 located between the main burners 16 adjacent in the circumferential direction. In the cylinder for a combustor 12 of the present embodiment, the positions in the circumferential direction of the cylindrical passage portions 35 are aligned with the positions in the circumferential direction of the centers of the main burners 16. Thus, the first cooling air introduced to the annular passage portion 34 from the cylindrical passage portions 35 reaches the portions of the wall portion of the transition piece 21 heated the most by the main burners 16 with the shortest distance. In other words, the portions of the wall portion of the transition piece 21 that is heated the most by the main burners 16 can be efficiently cooled. Accordingly, the wall portion of the transition piece 21 can be efficiently cooled using a small amount of first cooling air.

In the present embodiment, by arranging the plurality of cylindrical passage portions 35 at equal intervals in the circumferential direction of the transition piece 21, cooling by the first cooling fluid introduced to the annular passage portion 34 can be prevented from being unevenly distributed in the circumferential direction of the transition piece 21 in the upstream region 21A of the transition piece 21. Thus, the cylinder for a combustor 12 can be more effectively uniformly cooled. By improving the uniform cooling of the cylinder for a combustor 12, the amount of the first cooling fluid needed for cooling the cylinder for a combustor 12 can be reduced.

Third Embodiment

Next, a cylinder for a combustor, a combustor, and a gas turbine of a third embodiment according to the present invention will be described with reference to FIG. 9. In the third embodiment, components common to the first embodiment are given the same reference sign in the drawings and explanations thereof are omitted.

Figure 9:
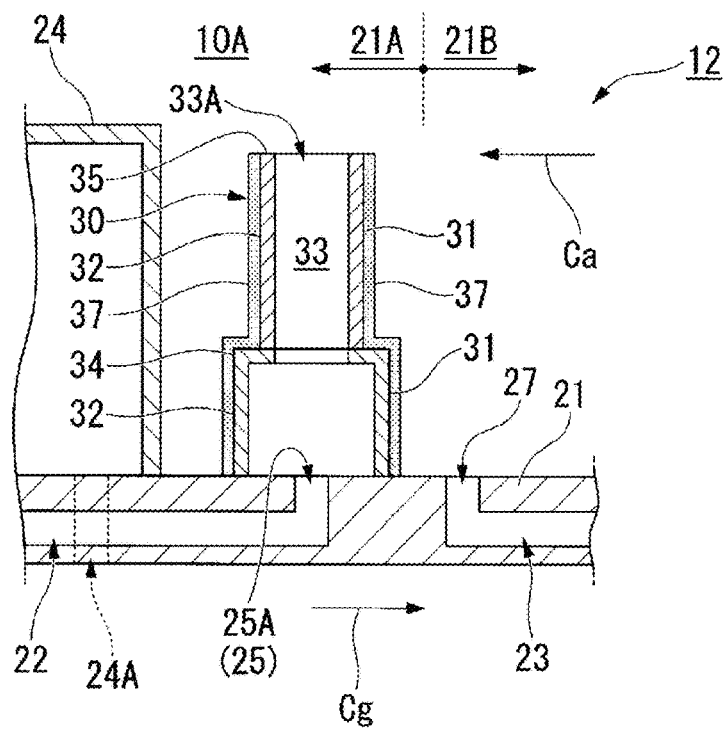
FIG. 9 is a cross-sectional view of the main components of a cylinder for a combustor according to a third embodiment of the present invention.

As illustrated in FIG. 9, the cylinder for a combustor 12 of the present embodiment is provided with the supply port extended portion 30 including the annular passage portion 34 and the cylindrical passage portion 35 similar to the first embodiment. The portions of the annular passage portion 34 and the cylindrical passage portion 35 located downstream of the downstream supply port 25A in the flow direction of the combustion gas Cg are constituted by the first wall portion 31. The portions of the annular passage portion 34 and the cylindrical passage portion 35 located upstream of the downstream supply port 25A in the flow direction of the combustion gas Cg are constituted by the second wall portion 32.

In the present embodiment, the supply port extended portion 30 is provided with a thermal insulation layer 37 that reduces thermal conduction at the first wall portion 31 and the second wall portion 32.

In the example illustrated, the thermal insulation layer 37 is provided on the side of the first wall portion 31 and the second wall portion 32 on the side facing the casing inner space 10A. However, the thermal insulation layer 37 may be provided on the side facing the guide passage 33 for example. The thermal insulation layer 37, for example, is formed by thermal spraying a thermal spray material with a low coefficient of thermal conductivity (for example ceramic-based material with a low coefficient of thermal conductivity) on the surface of the first wall portion 31 and the second wall portion 32 (the side facing the casing inner space 10A or the guide passage 33).

Alternatively for example, the first wall portion 31 and the second wall portion 32 may be divided in the thickness direction, and an air layer formed in the gap between the first wall portion 31 and the second wall portion 32 may be the thermal insulation layer 37.

According to the cylinder for a combustor 12 of the present embodiment, the same effect achieved by the first embodiment is achieved.

According to the cylinder for a combustor 12 of the present embodiment, the heat of the high temperature air discharged from the discharge port 27 of the second cooling passage 23 can be suppressed from transferring to the first cooling air introduced in the guide passage 33 of the supply port extended portion 30 via the first wall portion 31 or the second wall portion 32 by the thermal insulation layer 37. In other words, heating of the first cooling air introduced to the guide passage 33 can be suppressed. As a result the upstream region 21A of the transition piece 21 can be efficiently cooled by the first cooling air.

The configuration of the third embodiment described above can also be applied to the cylinder for a combustor of the second embodiment described above.

Fourth Embodiment

Next, a cylinder for a combustor, a combustor, and a gas turbine of a fourth embodiment according to the present invention will be described with reference to FIG. 10. In the fourth embodiment, components common to the first embodiment are given the same reference sign in the drawings and explanations thereof are omitted.

Figure 10:
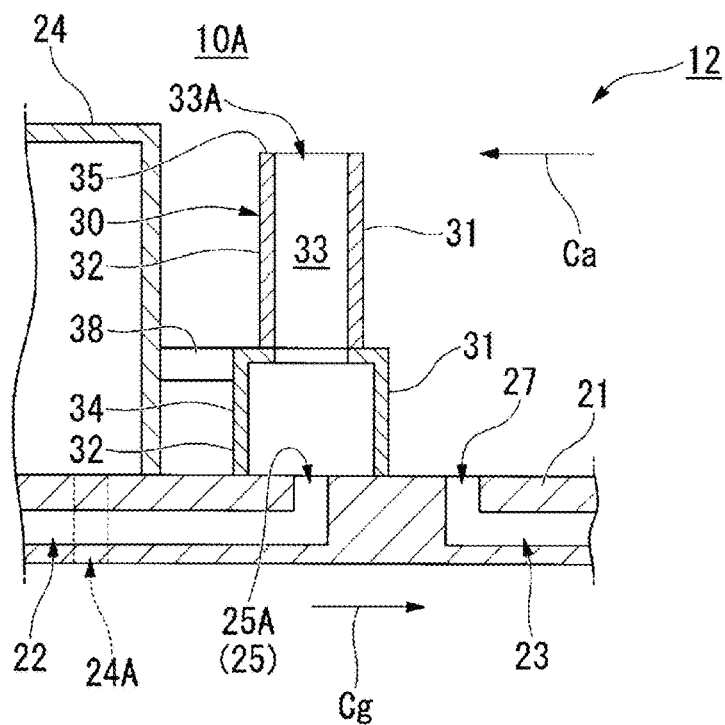
FIG. 10 is a cross-sectional view of the main components of a cylinder for a combustor according to a fourth embodiment of the present invention.

As illustrated in FIG. 10, the cylinder for a combustor 12 of the present embodiment is configured in a similar manner to the first embodiment. However, in the present embodiment, the supply port extended portion 30 of the cylinder for a combustor 12 is not supported by the outer peripheral surface 21c of the transition piece 21. The supply port extended portion 30 of the present embodiment is supported by the acoustic liner 24. Specifically, the supply port extended portion 30 is fixed to the acoustic liner 24 via a support portion 38. The support portion 38, for example, is connected to the supply port extended portion 30 and the acoustic liner 24 via welding, brazing, or the like. In the example illustrated, the support portion 38 is connected to the annular passage portion 34. However, the support portion 38 may, for example, be connected to the cylindrical passage portion 35.

The support portion 38, for example, may have a rod-like shape extending from the acoustic liner 24 to the supply port extended portion 30. In such a case, a plurality of the support portions 38 may be arranged in the circumferential direction of the transition piece 21. The support portion 38, for example, may have a circular arc-like or annular shape extending in the circumferential direction of the transition piece 21.

According to the cylinder for a combustor 12, and the combustor 2 and gas turbine GT provided with the same of the present embodiment configured as described above, the same effect achieved by the first embodiment is achieved.

According to the cylinder for a combustor 12 of the present embodiment, the supply port extended portion 30 is supported by the acoustic liner 24. As a result, the need to fix the supply port extended portion 30 to the outer peripheral surface 21c of the transition piece 21 is removed. Thus, an increase in thermal stress of the transition piece 21 caused by the fixing of the supply port extended portion 30 can be prevented more than in a case in which the supply port extended portion 30 is fixed to the transition piece 21 by welding or the like.

The configuration of the fourth embodiment described above can also be applied to the configuration of the second and third embodiment described above.

Fifth Embodiment

Next, a cylinder for a combustor, a combustor, and a gas turbine of a fifth embodiment according to the present invention will be described with reference to FIGS. 11 and 12. In the fifth embodiment, components common to the first embodiment are given the same reference sign in the drawings and explanations thereof are omitted.

Figure 11:
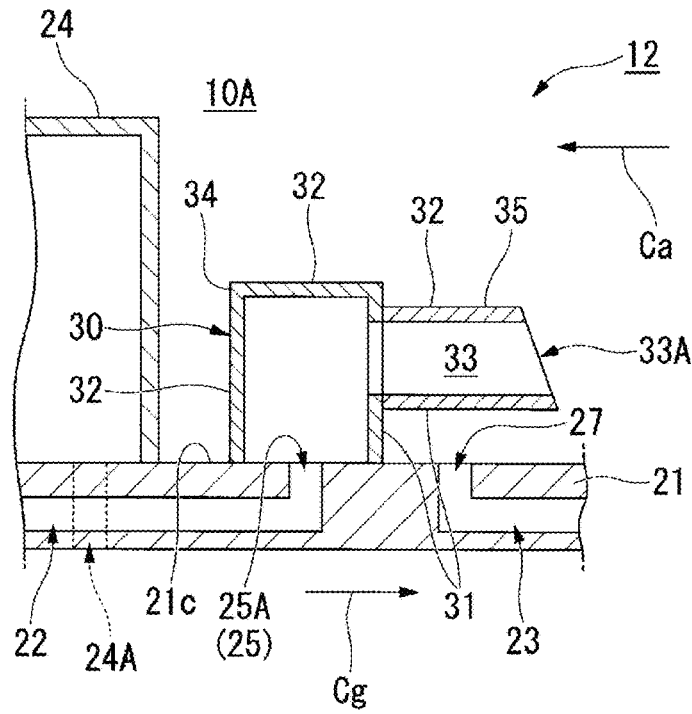
FIG. 11 is a cross-sectional view of the main components of a cylinder for a combustor according to a fifth embodiment of the present invention.
Figure 12:
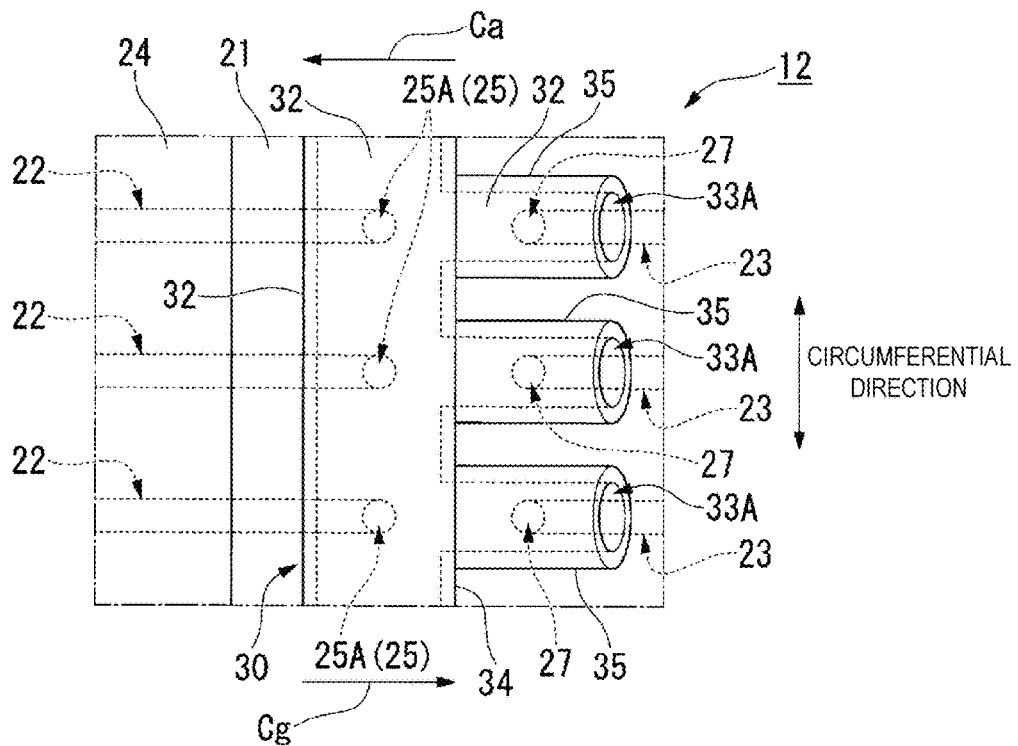
FIG. 12 is a plan view from outward in the radial direction of a transition piece of the main components of the cylinder for a combustor illustrated in FIG. 11.

As illustrated in FIGS. 11 and 12, the cylinder for a combustor 12 of the present embodiment is provided with the supply port extended portion 30 including the first wall portion 31 and the second wall portion 32 similar to the first embodiment. The guide passage 33 is formed between the first wall portion 31 and the second wall portion 32. The guide passage 33 guides the compressed air Ca, which will become the first cooling air, from the casing inner space 10A to the downstream supply port 25A of the first cooling passage 22. The opening portion 33A of the guide passage 33 to the casing inner space 10A is located spaced apart from the outer peripheral surface 21c of the transition piece 21.

However, in the present embodiment, the opening portion 33A of the guide passage 33 is located downstream of the discharge port 27 of the second cooling passage 23 in the flow direction of the combustion gas Cg and faces downstream in the flow direction of the combustion gas Cg. Accordingly, the first wall portion 31 and the second wall portion 32 of the present embodiment extend outward in the radial direction of the transition piece 21 from the outer peripheral surface 21c of the transition piece 21 then curve or bend to extend downstream of the discharge port 27 of the second cooling passage 23 in the flow direction of the combustion gas Cg. Thus, the portions of the second wall portion 32 extending downstream in the flow direction of the combustion gas Cg are located outward in the radial direction of the transition piece 21 further than the portions of the first wall portion 31 extending downstream in the flow direction of the combustion gas Cg.

In the example illustrated, the tip in the extending direction of the first wall portion 31 extending downstream in the flow direction of the combustion gas Cg is located downstream of the tip in the extending direction of the second wall portion 32 in the flow direction of the combustion gas Cg. However the tip in the extending direction of the first wall portion 31 is required to be located upstream of the tip in the extending direction of the second wall portion 32 in the flow direction of the combustion gas Cg.

In the cylinder for a combustor 12 of the present embodiment, the first wall portion 31 and the second wall portion 32 constitute the annular passage portion 34 in a similar manner to that of the first embodiment. The first wall portion 31 and the second wall portion 32 also constitute the cylindrical passage portion 35 in a similar manner to that of the second embodiment.

However, in the present embodiment, the opening portion 33A of the guide passage 33 described above faces downstream in the flow direction of the combustion gas Cg. As a result, the cylindrical passage portion 35 rectilinearly extends from the annular passage portion 34 downstream of the discharge port 27 of the second cooling passage 23 in the flow direction of the combustion gas Cg. In the present embodiment, a plurality of the cylindrical passage portions 35 are arranged at intervals in the circumferential direction of the transition piece 21.

The positions in the circumferential direction of the cylindrical passage portions 35 arranged in the circumferential direction of the transition piece 21 may be in alignment with the positions in the circumferential direction of the downstream supply ports 25A arranged in the circumferential direction of the transition piece 21 as illustrated in FIG. 12 for example. However, the positions in the circumferential direction of the cylindrical passage portions 35 may also be offset in the circumferential direction of the transition piece 21 with the position in the circumferential direction of the downstream supply port 25A.

According to the cylinder for a combustor 12, and the combustor 2 and gas turbine GT provided with the same of the present embodiment configured as described above, the same effect achieved by the first embodiment is achieved.

According to the cylinder for a combustor 12 of the present embodiment, the opening portion 33A of the guide passage 33 of the supply port extended portion 30 located spaced apart from the outer peripheral surface 21c of the transition piece 21 is located downstream of the discharge port 27 of the second cooling passage 23 in the flow direction of the combustion gas Cg and faces downstream in the flow direction of the combustion gas Cg. Thus, the high temperature air (second cooling air) discharged from the discharge port 27 of the second cooling passage 23 that opens to the outer peripheral surface 21c of the transition piece 21 can be suitably prevented from entering the guide passage 33.

According to the cylinder for a combustor 12 of the present embodiment, the opening portion 33A of the guide passage 33 faces downstream in the flow direction of the combustion gas Cg. As a result, the compressed air Ca that flows from downstream to upstream in the flow direction of the combustion gas Cg in the casing inner space 10A can be efficiently introduced.

According to the cylinder for a combustor 12 of the present embodiment, the length of the portions of the first wall portion 31 and the second wall portion 32 extending in the radial direction of the transition piece 21 from the outer peripheral surface 21c of the transition piece 21 can be suppressed to a shorter length than cases such as the first embodiment in which the opening portion 33A of the guide passage 33 faces outward in the radial direction of the transition piece 21.

The configuration of the fifth embodiment described above can also be applied to the configuration of the second to fourth embodiment described above.

Sixth Embodiment

Next, a cylinder for a combustor, a combustor, and a gas turbine of a sixth embodiment according to the present invention will be described with reference to FIGS. 13 to 15. In the sixth embodiment, components common to the first embodiment are given the same reference sign in the drawings and explanations thereof are omitted.

Figure 13:
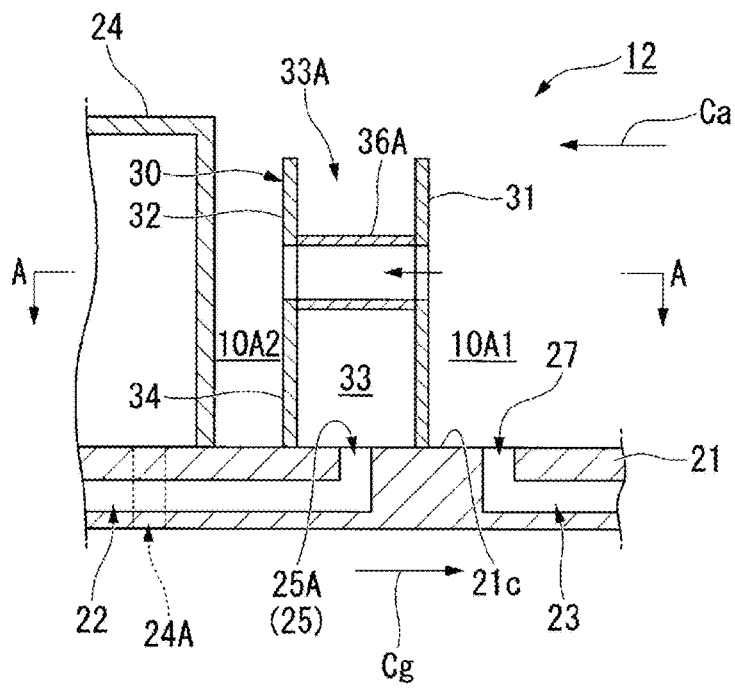
FIG. 13 is a cross-sectional view of the main components of a first example of a cylinder for a combustor according to a sixth embodiment of the present invention.
Figure 14:
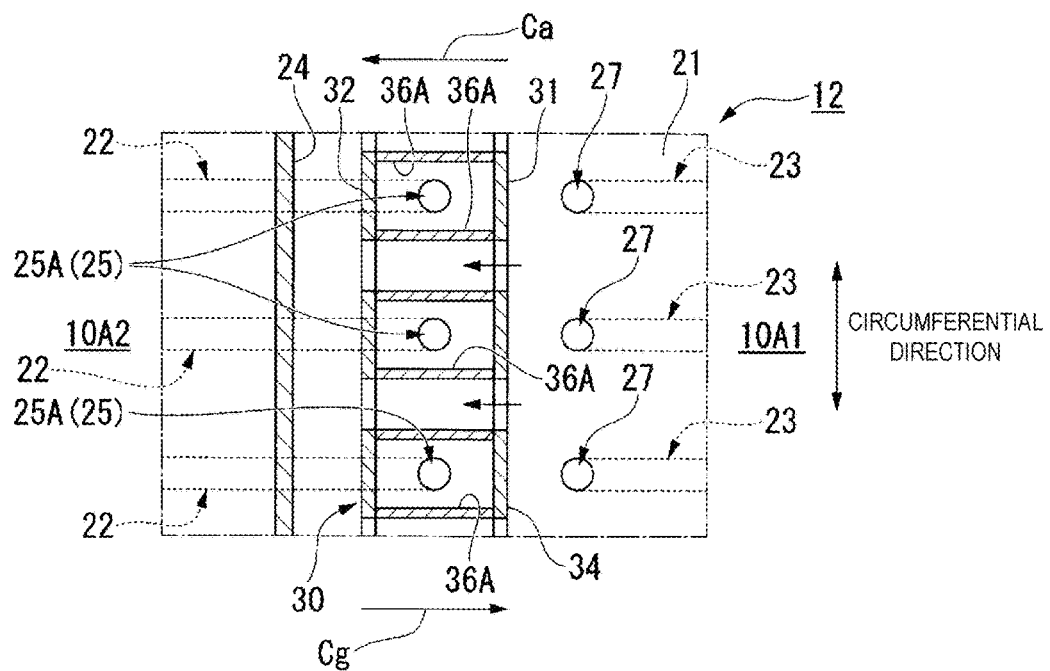
FIG. 14 is a cross-sectional view taken along A-A in the direction of the arrows in FIG. 13.
Figure 15:
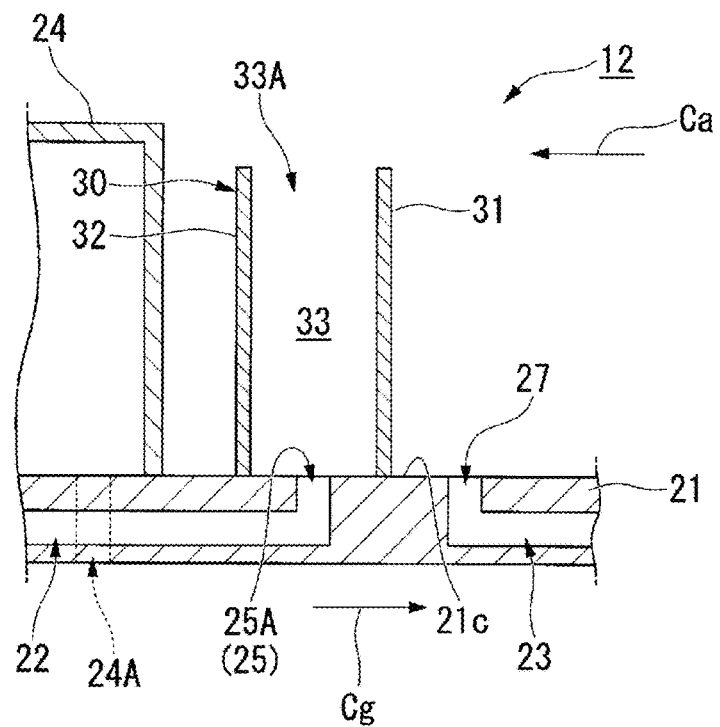
FIG. 15 is a cross-sectional view of the main components of a second example of the cylinder for a combustor according to the sixth embodiment of the present invention.

As illustrated in FIGS. 13 to 15, the cylinder for a combustor 12 of the present embodiment is provided with the supply port extended portion 30 including the first wall portion 31 and the second wall portion 32 similar to the first embodiment. The guide passage 33 is formed between the first wall portion 31 and the second wall portion 32. The guide passage 33 guides the compressed air Ca, which will become the first cooling air, from the casing inner space 10A to the downstream supply port 25A of the first cooling passage 22. The opening portion 33A of the guide passage 33 to the casing inner space 10A is located spaced apart from the outer peripheral surface 21c of the transition piece 21. The opening portion 33A of the guide passage 33 faces outward in the radial direction of the transition piece 21 and the first wall portion 31 and the second wall portion 32 extend outward in the radial direction of the transition piece 21.

However, in the present embodiment, the first wall portion 31 and the second wall portion 32 are formed around the entire of the transition piece 21 in the circumferential direction to form only the annular passage portion 34 that communicates with the downstream supply port 25A. In other words, the cylinder for a combustor 12 of the present embodiment is provided with the annular passage portion 34 but not with the cylindrical passage portions 35 such as those of the first embodiment. Accordingly, the opening portion 33A of the guide passage 33 of the present embodiment is formed around the entire of the transition piece 21 in the circumferential direction.

The supply port extended portion 30 illustrated in FIGS. 13 and 14 is provided with a communication portion 36A that communicates with a first space 10A1 and a second space 10A2 of the casing inner space 10A in a similar manner to that of the first embodiment. The first space 10A1 is located downstream of the first wall portion 31 in the flow direction of the combustion gas Cg and the second space 10A2 is located upstream of the second wall portion 32 in the flow direction of the combustion gas Cg.

The communication portion 36A of the present embodiment is constituted by a cylindrical member disposed between the first wall portion 31 and the second wall portion 32. Both ends of the cylindrical member open to the first space 10A1 and the second space 10A2 described above. In the example illustrated, a plurality of the cylindrical members are arranged at intervals in the circumferential direction of the transition piece 21, but the cylindrical member is not limited to such a configuration.

Alternatively, the supply port extended portion 30 illustrated in FIG. 15 may not be provided with the communication portion 36A (see FIGS. 13 and 14) and may only include the first wall portion 31 and the second wall portion 32.

According to the cylinder for a combustor 12, and the combustor 2 and gas turbine GT provided with the same of the present embodiment configured as described above, the same effect achieved by the first embodiment is achieved.

According to the cylinder for a combustor 12 of the present embodiment, the first wall portion 31 and the second wall portion 32 of the supply port extended portion 30 constitute only the annular passage portion 34. As a result, the supply port extended portion 30 can be manufactured using the first wall portion 31 and the second wall portion 32 with a simple form. Thus, the cylinder for a combustor 12 can be manufactured at a low cost.

The configuration of the sixth embodiment described above can also be applied to the cylinder for a combustor of the third to fifth embodiment described above.

Seventh Embodiment

Next, a cylinder for a combustor, a combustor, and a gas turbine of a seventh embodiment according to the present invention will be described with reference to FIG. 16. In the seventh embodiment, components common to the first embodiment are given the same reference sign in the drawings and explanations thereof are omitted.

Figure 16:
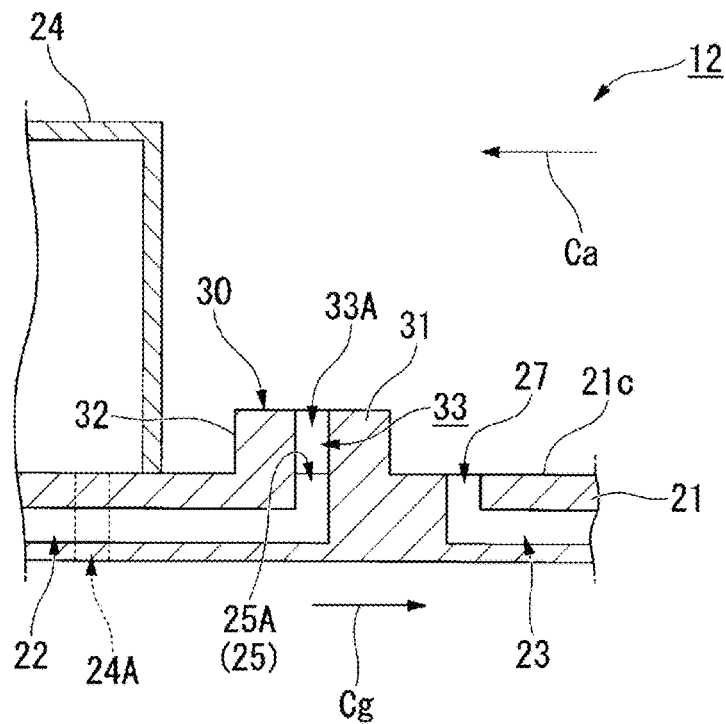
FIG. 16 is a cross-sectional view of the main components of a cylinder for a combustor according to a seventh embodiment of the present invention.

As illustrated in FIG. 16, the cylinder for a combustor 12 of the present embodiment is provided with the supply port extended portion 30 including the first wall portion 31 and the second wall portion 32 similar to the first embodiment. The guide passage 33 is formed between the first wall portion 31 and the second wall portion 32. The guide passage 33 guides the compressed air Ca, which will become the first cooling air, from the casing inner space 10A to the downstream supply port 25A of the first cooling passage 22. The opening portion 33A of the guide passage 33 to the casing inner space 10A is located spaced apart from the outer peripheral surface 21c of the transition piece 21.

However, the supply port extended portion 30 of the present embodiment is integrally formed with the transition piece 21. In other words, the first wall portion 31 and the second wall portion 32 are integrally formed with the transition piece 21 to protrude from the outer peripheral surface of the transition piece 21.

The opening portion 33A of the guide passage 33, for example, may be formed around the entire transition piece 21 in the circumferential direction in a similar manner to that of the sixth embodiment. Additionally, the first wall portion 31 and the second wall portion 32 may be formed as a plurality of cylindrical members separated in the circumferential direction of the transition piece 21 similar to the cylindrical passage portions 35 of the first embodiment. When a plurality of the opening portions 33A are formed, one supply port extended portion 30 may be provided for the downstream supply port 25A of each of the first cooling passages 22.

According to the cylinder for a combustor 12 of the present embodiment, the same effect achieved by the first embodiment is achieved.

According to the cylinder for a combustor 12 of the present embodiment, by integrally forming the supply port extended portion 30 with the transition piece 21, an increase in thermal stress of the transition piece 21 caused by the fixing of the supply port extended portion 30 can be prevented more than in a case in which the supply port extended portion 30 is fixed to the transition piece 21 by welding or the like.

The configuration of the seventh embodiment described above can also be applied to the cylinder for a combustor of the second to sixth embodiment described above.

Eighth Embodiment

Next, a cylinder for a combustor, a combustor, and a gas turbine of an eighth embodiment according to the present invention will be described with reference to FIGS. 17 to 20. In the eighth embodiment, components common to the embodiments described above are given the same reference sign in the drawings and explanations thereof are omitted.

Figure 17:
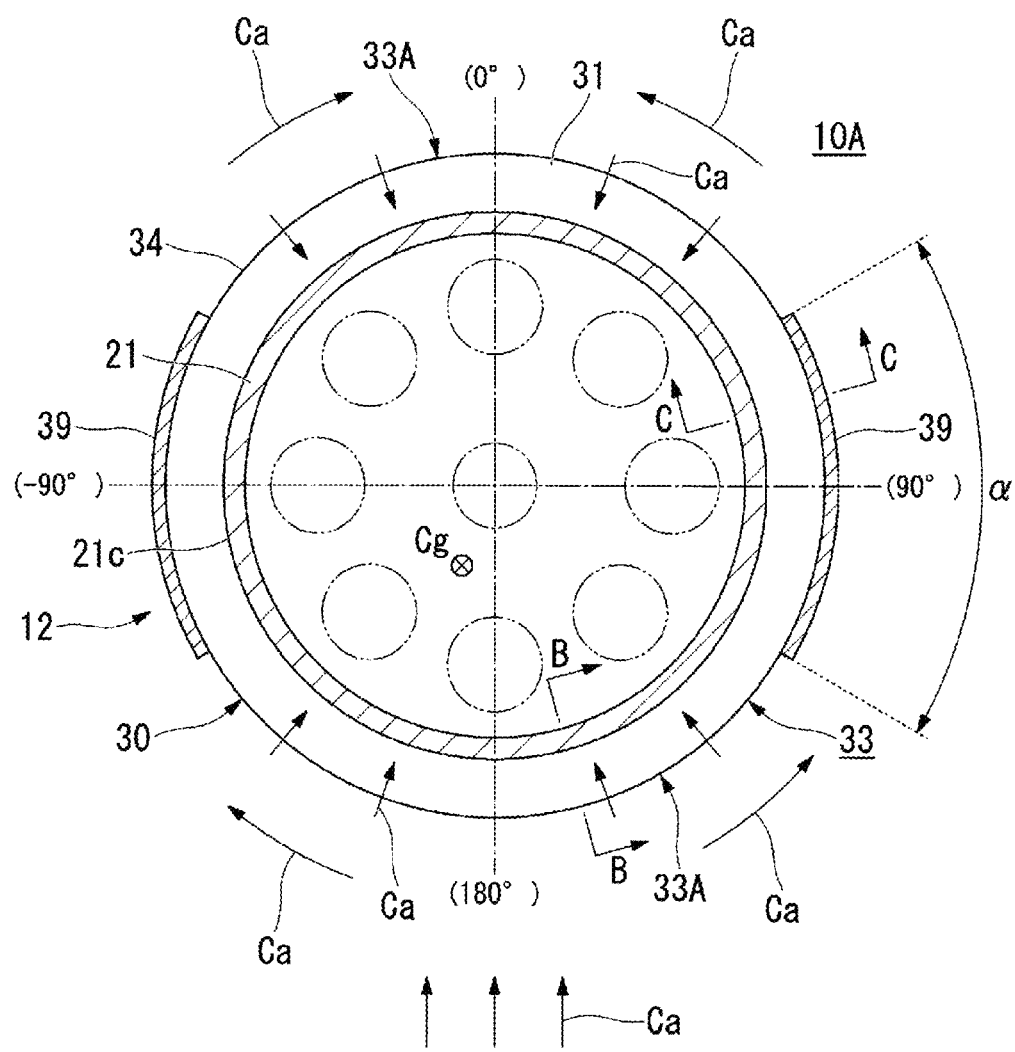
FIG. 17 is a schematic cross-sectional view from upstream in a flow direction of a combustion gas of a cylinder for a combustor according to an eighth embodiment of the present invention.
Figure 18:
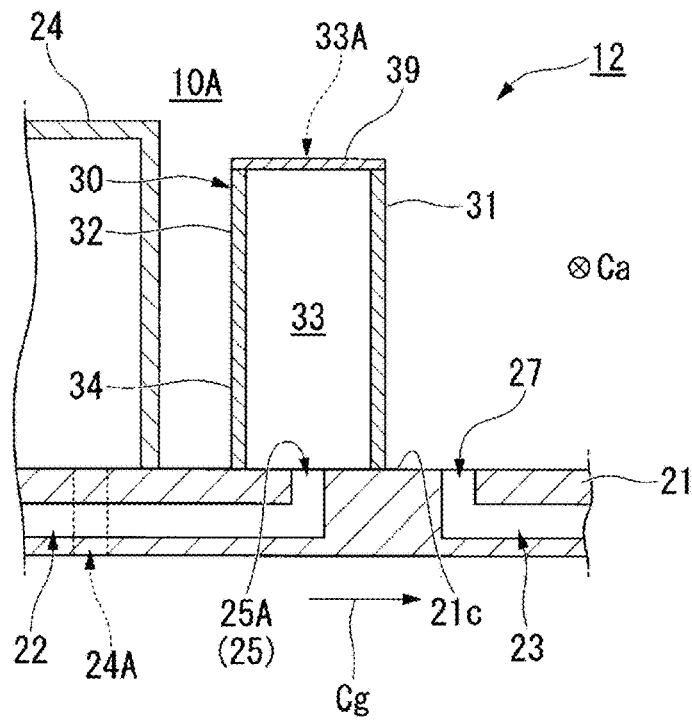
FIG. 18 is a view taken along C-C in FIG. 17 in the direction of the arrows.

As illustrated in FIGS. 17 and 18, in the cylinder for a combustor 12 of the present embodiment, the first wall portion 31 and the second wall portion 32 are formed around the entire of the transition piece 21 in the circumferential direction to form only the annular passage portion 34 that communicates with the downstream supply port 25A in a similar manner to that of the second example of the fifth embodiment illustrated in FIG. 15. Accordingly, the opening portion 33A of the guide passage 33 is formed around the entire of the transition piece 21 in the circumferential direction.

The cylinder for a combustor 12 of the present embodiment is provided with a prevention portion 39 that prevents the compressed air Ca from entering the annular passage portion 34 from the space outside of the transition piece 21. A pair of the prevention portions 39 are provided at counterpart positions in the radial direction of the transition piece 21.

In the present embodiment, each prevention portion 39 covers the opening portion 33A of the guide passage 33 constituted by the annular passage portion 34. Each prevention portion 39 covers a portion of the opening portion 33A in the circumferential direction of the transition piece 21 and not the entire opening portion 33A. In other words, the cross-sectional view taken along line B-B in the direction of the arrows of FIG. 17 corresponds to the cross-sectional shape illustrated in FIG. 15. The range of angle α, which is the range each prevention portion 39 extends in the circumferential direction of the transition piece 21, is preferably from 60° to 90°, for example. The pair of prevention portions 39 have the same size.

According to the cylinder for a combustor 12 of the present embodiment, even when the compressed air Ca flows in a direction that intersects the axis of the transition piece 21, the compressed air Ca can be efficiently introduced to the first cooling passage 22 from the downstream supply port 25A, and thus the upstream region 21A of the transition piece 21 can be more efficiently cooled. The specifics are described below.

As illustrated in FIG. 17 for example, when the compressed air Ca flowing in the flow direction of the compressed air Ca in the casing inner space 10A near the transition piece 21 includes a component of a flow direction orthogonal to the axial direction of the transition piece 21 (the direction from down to up in FIG. 17), the compressed air Ca flows along a circumferential direction conforming to the periphery of the transition piece 21. When this occurs, the flow velocity distribution and static pressure distribution in the circumferential direction near the periphery of the transition piece 21 becomes like that shown in the graphs of FIGS. 19 and 20.

Figure 19:
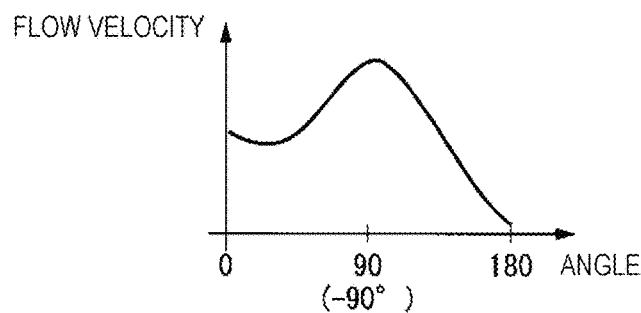
FIG. 19 is a graph showing the flow velocity distribution in the circumferential direction near the periphery of the transition piece illustrated in FIG. 17.
Figure 20:
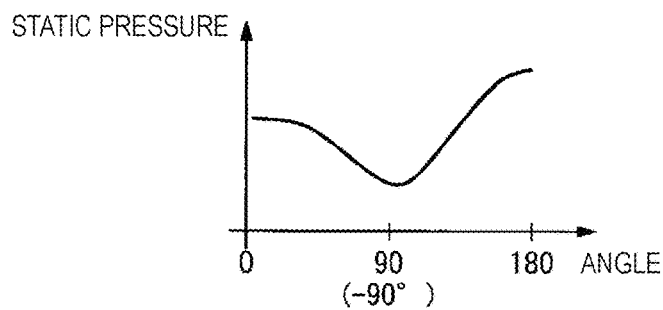
FIG. 20 is a graph showing the static pressure distribution in the circumferential direction near the periphery of the transition piece illustrated in FIG. 17.

In the graphs of FIGS. 19 and 20, of the transition piece 21, the position in the circumferential direction of the downstream flow direction of the compressed air Ca is taken as a standard position (0°) and the position in the circumferential direction of the upstream flow direction is taken as 180°. In the graphs of FIGS. 19 and 20, the intermediate positions in the circumferential direction between the upstream and downstream flow direction (intermediate circumferential position) of the transition piece 21 are taken as 90° and −90°.

According to the graphs of FIGS. 19 and 20, the flow velocity of the compressed air Ca near the periphery of the transition piece 21 increases from the upstream flow direction position of the transition piece 21 toward the intermediate circumferential position and decreases from the intermediate circumferential position toward the downstream flow direction position. Consequently, the static pressure of the compressed air Ca near the periphery of the transition piece 21 decreases from the upstream flow direction position of the transition piece 21 toward the intermediate circumferential position and increases from the intermediate circumferential position toward the downstream flow direction position.

As a result, when the prevention portion 39 is not provided, the amount of compressed air Ca introduced to the first cooling passage 22 from the downstream supply port 25A located at the intermediate circumferential position or nearby is reduced due to the low static pressure at the intermediate circumferential position of the transition piece 21 in the guide passage 33 and nearby.

Alternatively, as illustrated in FIG. 17, when the prevention portion 39 is disposed at a position based at the intermediate circumferential position of the transition piece 21, the decrease in static pressure in the guide passage 33 at the intermediate circumferential position of the transition piece 21 and nearby can be suppressed. Accordingly, compressed air Ca can be efficiently introduced to the first cooling passage 22 from the downstream supply port 25A located at the intermediate circumferential position or nearby, and thus the upstream region 21A of the transition piece 21 can be more efficiently cooled.

The configuration of the eighth embodiment described above can be applied to a cylinder for a combustor with the annular passage portion 34 constituted by at least the first wall portion 31 and the second wall portion 32. In other words, the configuration of the eighth embodiment can be applied to the cylinder for a combustor including the annular passage portion 34 of the first to seventh embodiments.

As illustrated in FIG. 4 for example, when the first wall portion 31 and the second wall portion 32 constitute the annular passage portion 34 and the cylindrical passage portion 35, the prevention portion 39 may be provided on the opening portion 33A of the guide passage 33 as in the eighth embodiment described above. However, the prevention portion 39 may also be provided inside the cylindrical passage portion 35 or at the boundary between the annular passage portion 34 and the cylindrical passage portion 35.

Ninth Embodiment

Next, a cylinder for a combustor, a combustor, and a gas turbine of a ninth embodiment according to the present invention will be described with reference to FIG. 21. In the ninth embodiment, components common to the embodiments described above are given the same reference sign in the drawings and explanations thereof are omitted.

Figure 21:
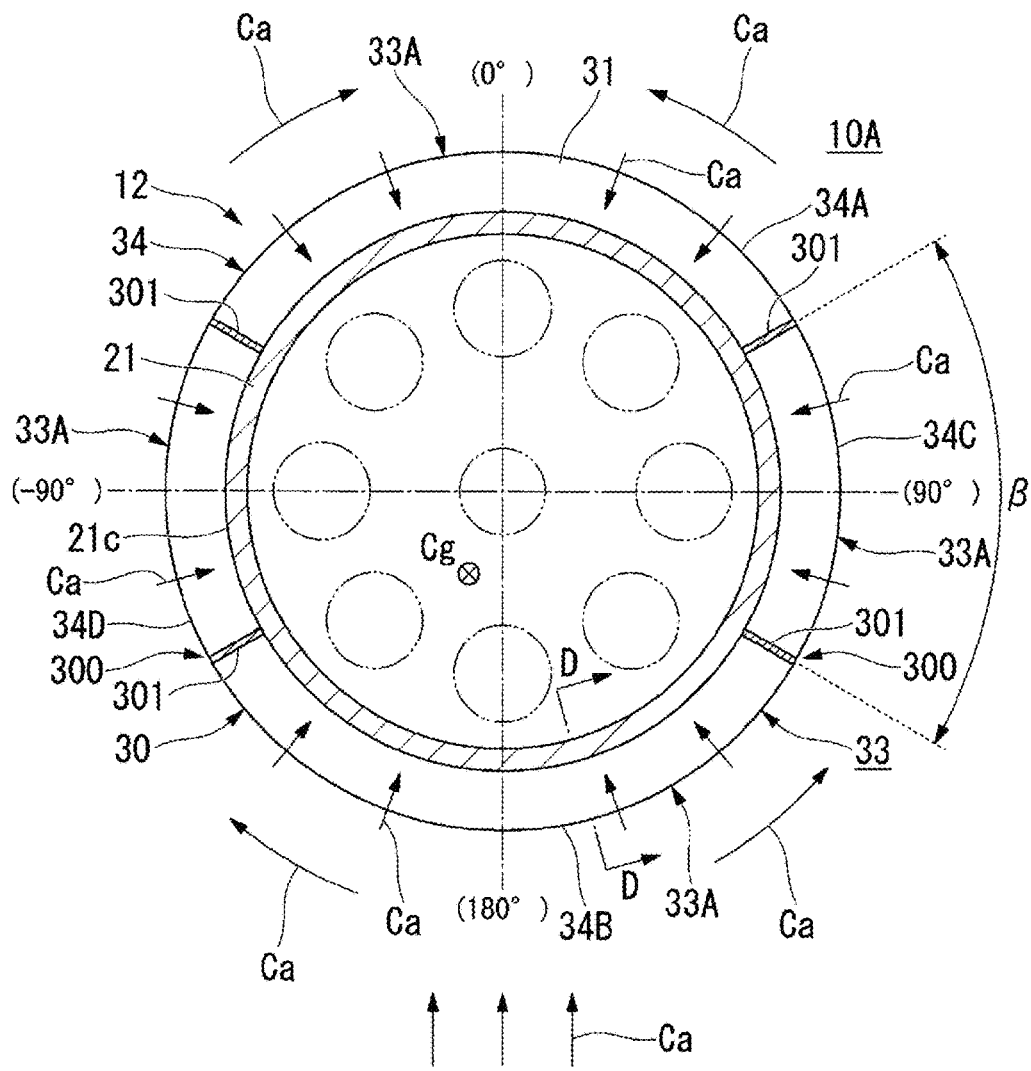
FIG. 21 is a schematic cross-sectional view from upstream in a flow direction of a combustion gas of a cylinder for a combustor according to a ninth embodiment of the present invention.

As illustrated in FIG. 21, in the cylinder for a combustor 12 of the present embodiment, the first wall portion 31 and the second wall portion 32 are formed around the entire of the transition piece 21 in the circumferential direction to form only the annular passage portion 34 that communicates with the downstream supply port 25A in a similar manner to that of the second example of the fifth embodiment illustrated in FIG. 15 and the eighth embodiment illustrated in FIGS. 17 and 18. Accordingly, the opening portion 33A of the guide passage 33 is formed around the entire of the transition piece 21 in the circumferential direction. The cross-sectional view taken along line D-D in the direction of the arrows of FIG. 21 corresponds to the cross-sectional shape illustrated in FIG. 15.

The cylinder for a combustor 12 of the present embodiment is provided with a partition portion 300 that divides the annular passage portion 34 in the circumferential direction of the transition piece 21. In the present embodiment, a pair of the partition portions 300 is formed at counterpart positions in the radial direction of the transition piece 21.

In the present embodiment, each partition portion 300 is constituted by a plurality of partition plates 301 arranged at intervals in the circumferential direction of the transition piece 21. In the present embodiment, each of the partition portions 300 is constituted by two partition plates 301. Accordingly, the annular passage portion 34 is divided into an even number (four in the example illustrated) of divided annular passage portions 34A, 34B, 34C, 34D arranged in the circumferential direction of the transition piece 21. The interval between the two partition plates 301 of each partition portion 300 in the circumferential direction, i.e. the range of angle β between the two partition plates 301, is preferably from 60° to 90°, for example.

According to the cylinder for a combustor 12 of the present embodiment, even when the compressed air Ca flows in a direction that intersects the axis of the transition piece 21, the compressed air Ca can be efficiently introduced to the first cooling passage 22 from the downstream supply port 25A, and thus the upstream region 21A of the transition piece 21 can be more efficiently cooled. The specifics are described below.

As illustrated in FIG. 21 for example, when the flow direction of the compressed air Ca in the casing inner space 10A near the transition piece 21 includes a component of the direction orthogonal to the axial direction of the transition piece 21 (the direction from down to up in FIG. 21), the compressed air Ca flows in the casing inner space 10A along a circumferential direction conforming to the periphery of the transition piece 21. When this occurs, the flow velocity distribution and static pressure distribution in the circumferential direction near the periphery of the transition piece 21 becomes similar to that shown in the graphs of FIGS. 19 and 20 of the eighth embodiment.

Thus, when the partition portion 300 is not provided, the amount of compressed air Ca introduced to the first cooling passage 22 from the downstream supply port 25A located at the intermediate circumferential position of the transition piece 21 (at a position corresponding to 90° and −90° in FIG. 21) or nearby is reduced.

Alternatively, as illustrated in FIG. 21, when the partition portions 300 are disposed at positions based at the intermediate circumferential positions of the transition piece 21, the flow of the compressed air Ca in the circumferential direction of the transition piece 21 is obstructed at the divided annular passage portions 34A, 34B, 34C, 34D by the partition portions 300. Thus, the reduction in static pressure at each divided annular passage portion 34A, 34B, 34C, 34D can be suppressed. In particular, the reduction in static pressure at the divided annular passage portions 34C, 34D located at the intermediate circumferential positions can be suppressed. Accordingly, compressed air Ca can be efficiently introduced to the first cooling passage 22 from the downstream supply port 25A located at the intermediate circumferential position of the transition piece 21 or nearby, and thus the upstream region 21A of the transition piece 21 can be more efficiently cooled.

The configuration of the ninth embodiment described above can be applied to a cylinder for a combustor with the annular passage portion 34 constituted by at least the first wall portion 31 and the second wall portion 32. In other words, the configuration of the ninth embodiment can be applied to the cylinder for a combustor including an annular passage portion 34 of the first to eighth embodiments.

Tenth Embodiment

Next, a cylinder for a combustor, a combustor, and a gas turbine of a tenth embodiment according to the present invention will be described.

In the cylinder for a combustor 12 of the present embodiment, the first wall portion 31 and the second wall portion 32 are formed around the entire of the transition piece 21 in the circumferential direction to form the annular passage portion 34 that communicates with the downstream supply port 25A in a similar manner to that of the first to ninth embodiments illustrated in FIGS. 1 to 21. In the present embodiment, the passage cross-sectional area of the annular passage portion 34 orthogonal to the circumferential direction of the transition piece 21 is, for example, equal to or greater than 50 times the opening area of the downstream supply port 25A to the outer peripheral surface 21c of the transition piece 21.

According to the cylinder for a combustor of the present embodiment, when the passage cross-sectional area of the annular passage portion 34 is equal to or greater than 50 times the opening area of the downstream supply port 25A, pressure loss of the first cooling air (compressed air Ca) introduced to the annular passage portion 34 from the casing inner space 10A when the first cooling air flows around the annular passage portion 34 in the circumferential direction thereof can be suppressed. In other words, even if the first cooling air flows in the circumferential direction of the annular passage portion 34, reduction in the static pressure in the annular passage portion 34 can be suppressed. As a result, the first cooling air in the annular passage portion 34 can be efficiently introduced to the first cooling passage 22. Because a difference in pressure in the annular passage portion 34 in the circumferential direction thereof can be suppressed, a difference in the flow amount of the first cooling air introduced to the plurality of first cooling passages arranged in the circumferential direction can be suppressed.

According to the cylinder for a combustor of the present embodiment, the resistance when the first cooling air is introduced to the first cooling passage 22 from the annular passage portion 34 via the downstream supply port 25A can be kept to a low amount. As a result, the first cooling air can be smoothly introduced to the first cooling passage 22.

Eleventh Embodiment

Next, a cylinder for a combustor, a combustor, and a gas turbine of an eleventh embodiment according to the present invention will be described with reference to FIGS. 22 and 23. In the eleventh embodiment, components common to the first embodiment are given the same reference sign in the drawings and explanations thereof are omitted.

Figure 22:
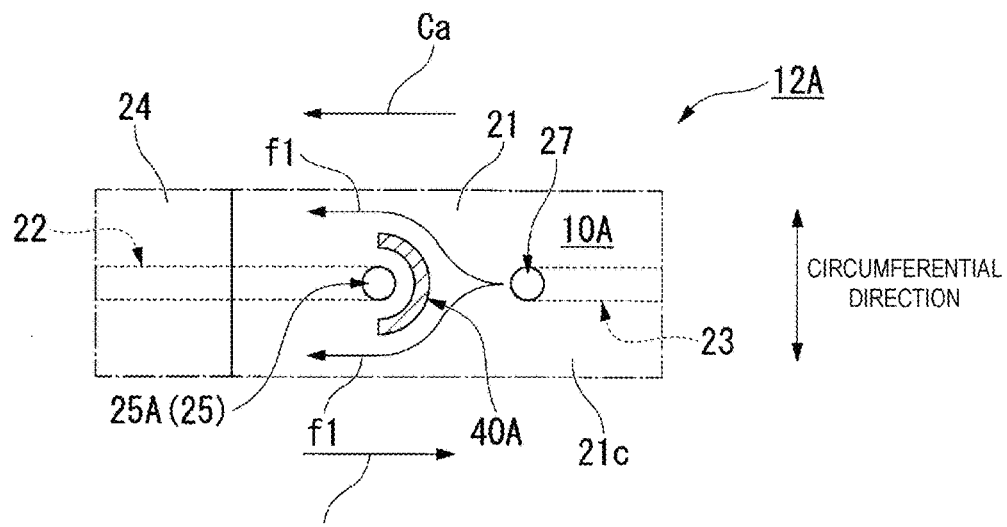
FIG. 22 is a plan view of the main components of a first example of a cylinder for a combustor according to an eleventh embodiment of the present invention.
Figure 23:
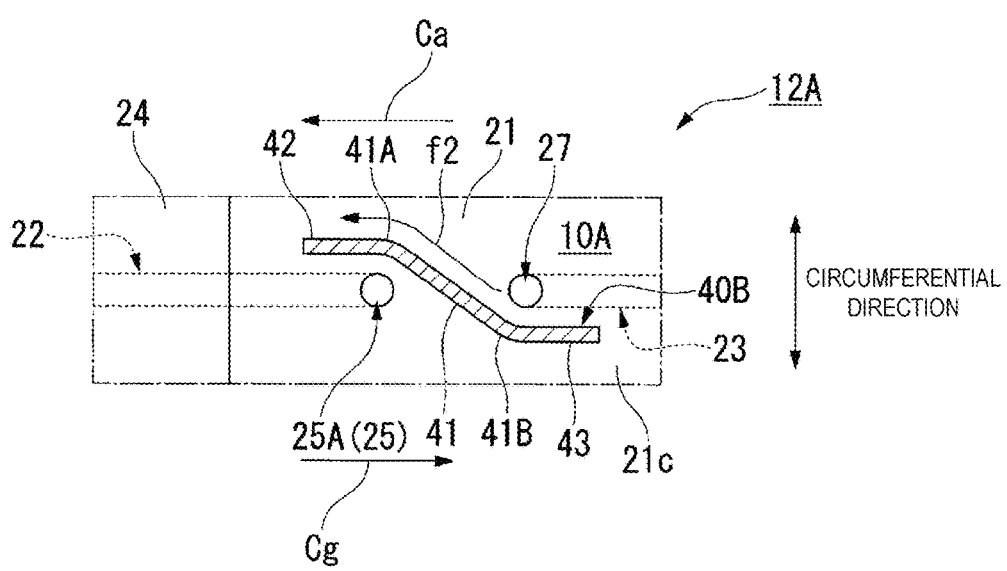
FIG. 23 is a plan view of the main components of a second example of a cylinder for a combustor according to the eleventh embodiment of the present invention.

As illustrated in FIGS. 22 and 23, the cylinder for a combustor 12A of the present embodiment is provided with the transition piece 21 (cylindrical member) similar to that of the first embodiment, the first cooling passage 22, the second cooling passage 23, and the acoustic liner 24. However, the cylinder for a combustor 12A is not provided with the supply port extended portion 30 of the first embodiment (see FIGS. 4 and 5) and is instead provided with guide wall portions 40A, 40B.

The guide wall portions 40A, 40B are formed between the downstream supply port 25A of the first cooling passage 22 and the discharge port 27 of the second cooling passage 23 and extend away from the outer peripheral surface 21c of the transition piece 21. In the present embodiment, the guide wall portions 40A, 40B extend outward in the radial direction of the transition piece 21. The compressed air Ca (fluid) flowing upstream in the casing inner space 10A from downstream in the flow direction of the combustion gas Cg is guided by the guide wall portions 40A, 40B from the downstream supply port 25A in the circumferential direction of the transition piece 21 and upstream of the downstream supply port 25A in the flow direction of the combustion gas Cg. The reference signs f1, f2 in FIGS. 22 and 23 denote the directions the compressed air Ca is guided in by the guide wall portions 40A, 40B in the casing inner space 10A.

The guide wall portion 40A illustrated in FIG. 22 is formed inclined upstream in the flow direction of the combustion gas Cg from the downstream supply port 25A toward the circumferential sides of the transition piece 21 when viewed from outward in the radial direction of the transition piece 21. The guide wall portion 40A illustrated in FIG. 22 is formed to clamp the downstream supply port 25A from the circumferential direction when viewed from outward in the radial direction of the transition piece 21. The guide wall portion 40A may be formed in a U shape (circular arc shape) when viewed from outward in the radial direction of the transition piece 21 as in FIG. 22, but may also be formed in a V shape, for example.

The guide wall portion 40B illustrated in FIG. 23 is provided with a first plate-like wall portion 41, a second plate-like wall portion 42, and a third plate-like wall portion 43. When viewed from outward in the radial direction of the transition piece 21, the first plate-like wall portion 41 extends in the circumferential direction of the transition piece 21 between the downstream supply port 25A of the first cooling passage 22 and the discharge port 27 of the second cooling passage 23; the second plate-like wall portion 42 extends from a first end portion 41A of the first plate-like wall portion 41 in the extending direction upstream in the flow direction of the combustion gas Cg; and the third plate-like wall portion 43 extends from a second end portion 41B of the first plate-like wall portion 41 in the extending direction downstream in the flow direction of the combustion gas Cg.

The first end portion 41A and the second end portion 41B of the first plate-like wall portion 41 are offset to opposite sides in the circumferential direction of the transition piece 21 from the downstream supply port 25A of the first cooling passage 22 and the discharge port 27 of the second cooling passage 23. The first end portion 41A of the first plate-like wall portion 41 is located upstream in the flow direction of the combustion gas Cg of the second end portion 41B. In other words, the first plate-like wall portion 41 extends in a direction inclined toward the flow direction of the combustion gas Cg with respect to the circumferential direction of the transition piece 21 when viewed from outward in the radial direction of the transition piece 21.

The second plate-like wall portion 42 is located adjacent to one side in the circumferential direction of the transition piece 21 of the downstream supply port 25A of the first cooling passage 22. The second plate-like wall portion 42 extends upstream of the downstream supply port 25A in the flow direction of the combustion gas Cg.

The third plate-like wall portion 43 is located adjacent to the other side in the circumferential direction of the transition piece 21 of the discharge port 27 of the second cooling passage 23. The third plate-like wall portion 43 extends downstream of the downstream supply port 25A in the flow direction of the combustion gas Cg.

According to the cylinder for a combustor 12A of the present embodiment configured as such, even when compressed air Ca in the casing inner space 10A flows in the direction opposite the flow direction of the combustion gas Cg inside the transition piece 21, the high temperature air discharged from the discharge port 27 of the second cooling passage 23 can be prevented from entering the first cooling passage 22 from the downstream supply port 25A by the guide wall portions 40A, 40B.

The compressed air Ca flowing in the casing inner space 10A in the direction opposite the flow direction of the combustion gas Cg is guided by the guide wall portions 40A, 40B in the circumferential direction of the transition piece 21 and upstream of the downstream supply port 25A in the flow direction of the combustion gas Cg. Thus, if the high temperature air flows upstream of the downstream supply port 25A in the flow direction of the combustion gas Cg due to the flow of the compressed air Ca in the casing inner space 10A, the high temperature air can be prevented from approaching the downstream supply port 25A by the guide wall portions 40A, 40B. Accordingly, the high temperature air, after flowing upstream of the downstream supply port 25A in the flow direction of the combustion gas Cg, can be prevented from entering the first cooling passage 22 from the downstream supply port 25A.

According to the cylinder for a combustor 12A and the combustor 2 and gas turbine GT provided with the same according to the present embodiment described above, the high temperature air discharged from the discharge port 27 of the second cooling passage 23 can be more reliably prevented from entering the first cooling passage 22, and the upstream region 21A of the transition piece 21 can be efficiently cooled by the low temperature first cooling fluid introduced to the first cooling passage 22. In other words, the cooling efficiency of the cylinder for a combustor 12A can be enhanced.

The specifics of the present invention have been described above, however the present invention is not limited to the embodiments described above, and various modifications can be made without deviating from the spirit of the present invention.

Figure 24:
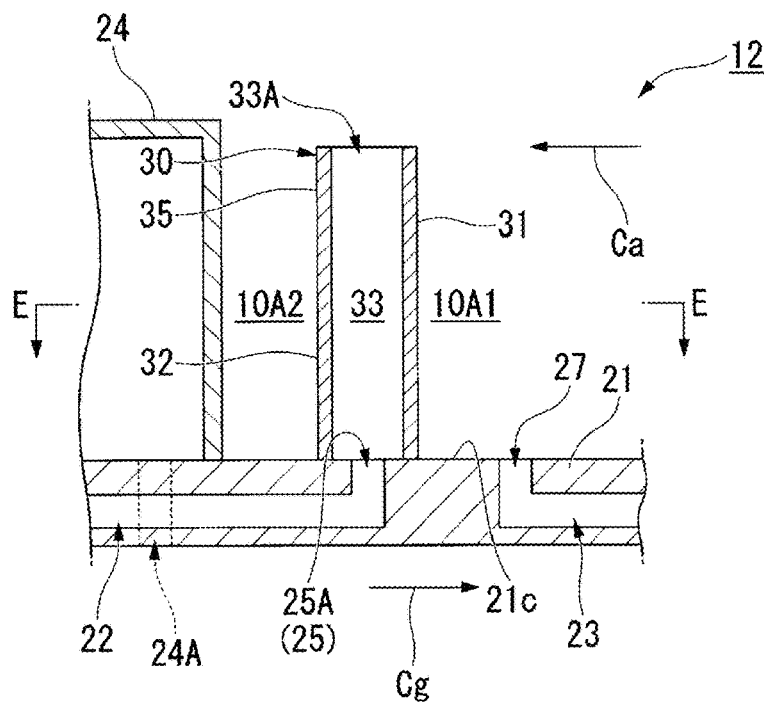
FIG. 24 is a cross-sectional view of the main components of a cylinder for a combustor according to another embodiment of the present invention.
Figure 25:
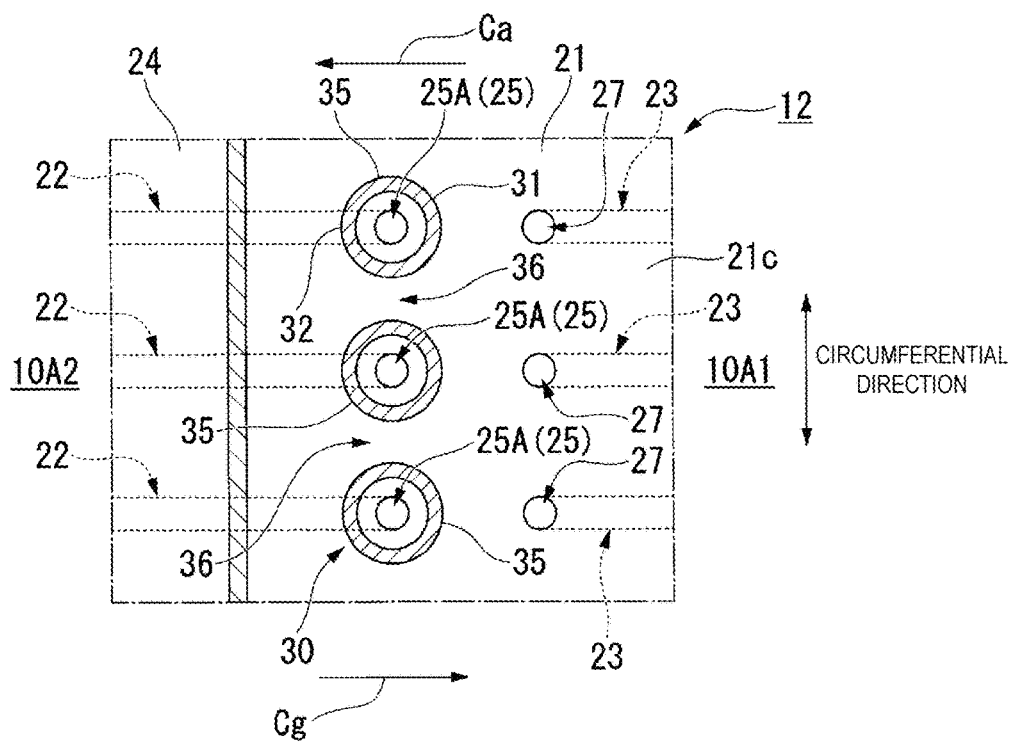
FIG. 25 is a cross-sectional view taken along E-E in FIG. 24 in the direction of the arrows.

For example, in the first to seventh embodiment, the first wall portion 31 and the second wall portion 32 of the supply port extended portion 30 may have a cylindrical shape and only the plurality of cylindrical passage portions 35 communicating with the downstream supply ports 25A are disposed at intervals in the circumferential direction of the transition piece 21, as illustrated in FIGS. 24 and 25, for example. In other words, the supply port extended portion 30 may be provided with the plurality of cylindrical passage portions 35 but not the annular passage portion 34. In such a case, in a similar manner to that of the first embodiment, the gaps between the cylindrical passage portions 35 adjacent in the circumferential direction function as the communication portions 36.

In the first to ninth embodiment, the first wall portion 31 and the second wall portion 32 may, for example, extend at an incline downstream in the flow direction of the combustion gas Cg from the outer peripheral surface 21c of the transition piece 21 outward in the radial direction of the transition piece 21.

In the first to ninth embodiment, the supply port extended portion 30 may be not provided at the supply port 25 of the first cooling passage 22 but provided at the discharge port 27 of the second cooling passage 23. In such a case, the high temperature air discharged from the discharge port 27 of the second cooling passage 23 is discharged from the supply port extended portion 30 to the casing inner space 10A at a position spaced apart from the outer peripheral surface 21c of the transition piece 21. Accordingly, the high temperature air has difficulty reaching the supply port 25 of the first cooling passage 22 that opens directly to the casing inner space 10A at the outer peripheral surface 21c of the transition piece 21. In other words, the high temperature air can be prevented from entering the first cooling passage 22.

In the fifth embodiment, the opening portion 33A of the guide passage 33 may face a direction other than downstream in the flow direction of the combustion gas Cg. In the fifth embodiment, the opening portion 33A may be located upstream of the discharge port 27 of the second cooling passage 23 in the flow direction of the combustion gas Cg or may be located at a position aligned with the discharge port 27 in the flow direction of the combustion gas Cg.

Specifically, for example, when the opening portion 33A of the guide passage 33 is located downstream of the discharge port 27 of the second cooling passage 23 in the flow direction of the combustion gas Cg, the opening portion 33A may face a discretionary direction other than downstream in the flow direction of the combustion gas Cg.

For example, when the opening portion 33A of the guide passage 33 faces downstream in the flow direction of the combustion gas Cg inclined at a direction outward in the radial direction of the transition piece 21 or faces outward in the radial direction of the transition piece 21, the opening portion 33A may be located upstream of the discharge port 27 of the second cooling passage 23 in the flow direction of the combustion gas Cg or may be located at a position aligned with the discharge port 27 in the flow direction of the combustion gas Cg.

In such cases, in a similar manner to that of with the fifth embodiment, the high temperature air discharged from the discharge port 27 of the second cooling passage 23 can be suitably prevented from entering the guide passage 33.

INDUSTRIAL APPLICABILITY

The present invention can be applied to a cylinder for a combustor, a combustor, and a gas turbine and is designed to enhance the cooling efficiency of a cylinder for a combustor.

REFERENCE SIGNS LIST

GT Gas turbine
1 Compressor
2 Combustor
3 Turbine
10A Casing inner space (space outside of the transition piece 21)
12, 12A Cylinder for a combustor
14 Burner
15 Pilot burner
16 Main burner (burner)
21 Transition piece (cylindrical member)
21A Upstream region
21B Downstream region
21c Outer peripheral surface
22 First cooling passage
23 Second cooling passage
24 Acoustic liner
25 Supply port
25A Downstream supply port
27 Discharge port
30 Supply port extended portion
31 First wall portion
32 Second wall portion
33 Guide passage
33A Opening portion
34 Annular passage portion
34A, 34B, 34C, 34D Divided annular passage portion
35 Cylindrical passage portion
36, 36A Communication portion
37 Thermal insulation layer
38 Support portion
39 Prevention portion 40A, 40B Guide wall portion
300 Partition portion
301 Partition plate
Ca Compressed air (fluid)
Cg Combustion gas

The invention claimed is:

1. A cylinder for a combustor through which a combustion gas is configured to flow, the combustor being configured to send the combustion gas to a turbine, and the cylinder comprising:
a cylindrical member extending along a central axis of the cylinder and being disposed in a casing inner space defined inside a casing of the gas turbine;
a first cooling passage defined in an upstream region of a wall of the cylindrical member located upstream in a flow direction of the combustion gas;
a second cooling passage defined in a downstream region of the wall of the cylindrical member located downstream in the flow direction of the combustion gas next to the upstream region; and
a supply port extender,
wherein:
the first cooling passage includes a supply port that opens to an outer peripheral surface of the wall of the cylindrical member, the supply port disposed at a downstream end of the first cooling passage in the flow direction of the combustion gas;
the first cooling passage is configured to cool the upstream region via a first cooling air that is introduced from the casing inner space via the supply port, the first cooling air being a portion of a compressed air contained in the casing inner space;
the second cooling passage includes a discharge port that opens to the outer peripheral surface of the wall of the cylindrical member downstream of the supply port in the flow direction of the combustion gas, the discharge port disposed at an upstream end of the second cooling passage in the flow direction of the combustion gas;
the second cooling passage is configured to cool the downstream region via a second cooling air that is only air obtained by pressurizing a portion of the compressed air contained in the casing inner space by a pressurizing device outside the casing;
the discharge port is configured to discharge the second cooling air to the casing inner space;
the supply port extender includes a first wall disposed on the outer peripheral surface of the wall of the cylindrical member between the supply port and the discharge port, the first wall comprising a straight portion extending circumferentially about, and radially outward from, the outer peripheral surface of the wall of the cylindrical member with respect to the central axis; and
the supply port extender further includes a second wall disposed on the outer peripheral surface of the wall of the cylindrical member upstream of the supply port in the flow direction of the combustion gas, the second wall comprising a straight portion extending circumferentially about, and radially outward from, the outer peripheral surface of the wall of the cylindrical member with respect to the central axis;
wherein the first wall further comprises a step portion that extends axially forward from a radially outermost end of the straight portion of the first wall and the second wall further comprises a step portion that extends axially aft from a radially outermost end of the straight portion of the second wall;
wherein the step portion of the first wall and the step portion of the second wall merge to form a single adjoining wall portion extending axially from the straight portion of the first wall to the straight portion of the second wall, the adjoining wall portion being spaced apart from the outer peripheral surface of the wall of the cylindrical member in a radially outward direction to form an annular passage portion between the straight portions of the first and second walls;
wherein the first wall and the second wall each further comprise a semi-cylindrical portion extending radially outward from the adjoining wall portion, the semi-cylindrical portion of the first wall and the semi-cylindrical portion of the second wall merging to form a single cylindrical passage portion; and
wherein, the cylindrical passage portion is in fluid communication with the annular passage portion through an opening in the adjoining wall portion.

2. The cylinder according to claim 1, further comprising:
a guide passage defined between the first wall and the second wall and formed by the annular passage portion and the cylindrical passage portion, the guide passage being configured to guide the first cooling air from the casing inner space to the supply port,
wherein the guide passage includes an opening of the cylindrical passage portion to the casing inner space that faces outward in a radial direction relative to the central axis of the cylinder.

3. The cylinder according to claim 1, wherein the first wall and the second wall are defined around an entirety of the cylindrical member in a circumferential direction of the cylindrical member so as to form the annular passage portion that communicates with the supply port.

4. The cylinder according to claim 3, wherein a passage cross-sectional area of the annular passage portion orthogonal to the circumferential direction of the cylindrical member is equal to or greater than 50 times an opening area of the supply port.

5. The cylinder according to claim 1, wherein the supply port extender includes a thermal insulation layer configured to decrease thermal conduction at the first all and the second wall.

6. The cylinder according to claim 1, wherein the supply port extender is supported by the outer peripheral surface of the cylindrical member.

7. The cylinder according to claim 1, further comprising:
an acoustic liner disposed upstream of the supply port extender in the flow direction of the combustion gas, wherein the supply port extender is supported by the acoustic liner.

8. The cylinder according to claim 1, wherein the supply port extender is formed integrally with the cylindrical member.

9. A combustor, comprising: the cylinder according to claim 1; and a burner configured to spray fuel.

10. A gas turbine, comprising: the combustor according to claim 9; a compressor configured to generate compressed air to be fed to the combustor; and a turbine including a rotor configured to be rotated by combustion gas fed from the combustor.

* * * * *